United States Patent
Burkitbaev

(12) 
(10) Patent No.: US 6,451,174 B1
(45) Date of Patent: Sep. 17, 2002

(54) HIGH FREQUENCY ENERGY APPLICATION TO PETROLEUM FEED PROCESSING

(76) Inventor: Serik M. Burkitbaev, 130 Furmanov Street, Almary, 48009 (KG)

(*) Notice: Subject to any disclaimer, the term of this patent is extended or adjusted under 35 U.S.C. 154(b) by 0 days.

(21) Appl. No.: 09/709,307

(22) Filed: Nov. 13, 2000

(51) Int. Cl.$^7$ .............................................. C07C 1/00
(52) U.S. Cl. ..................... 204/157.15; 44/904; 44/905
(58) Field of Search ..................... 204/157.15, 157.3, 204/157.61, 157.6, 157.4, 157.41, 157.43; 44/904, 905

(56) References Cited

U.S. PATENT DOCUMENTS

| | | | | |
|---|---|---|---|---|
| 4,279,722 A | * | 7/1981 | Kirkbride | 204/162 R |
| 4,545,879 A | * | 10/1985 | Wan et al. | 204/158 R |
| 4,574,038 A | * | 3/1986 | Wan | 204/162 R |

* cited by examiner

*Primary Examiner*—Edna Wong
(74) *Attorney, Agent, or Firm*—McGuireWoods LLP

(57) ABSTRACT

The present invention provides a method and apparatus for maintaining the active life of a catalyst in organic feed processing by applying a series of electromagnetic radiation pulses to the catalyst in a reactor. The pulsing of the catalyst selectively heats and cools the catalyst and can regulate the relative internal pressure of the catalyst particles to stimulate the acceleration of oil macromolecules mass-exchange through the catalyst pores and surface. This allows for the removal of cracked oil molecules from the particles. The application of electromagnetic pulses also regulates the activity of the catalyst. The electromagnetic radiation reduces the formation of coke on the catalyst and increases the life of the catalyst in the reactor. Further, the present invention provides a method and apparatus for removing water and salt from an organic feed. Water and salt is removed by applying a series of electromagnetic radiation pulses to the organic feed.

13 Claims, 11 Drawing Sheets

MASS EXCHANGE IN
DIFFERENT REGIMES (CLASSIC)

- $t_{Trelax} \sim 10^{-3}\text{-}10^{-1}$ s

- $t_D \sim 10^{-2}\text{-}10^0$ s

- $t_D \gg t_{crack}$

- $t_D \sim t_{reactor} \sim 10^{-1}\text{-}10^0$ s

- UNDER DIFFUSION MECHANISM THERE ARE ONLY A FEW MASS EXCHANGES DURRING THE LIFETIME OF CATALYST PARTICLES IN REATOR COLUMN

HIGH FREQUENCY ENERGY APPLICATION TO PETROLEUM FEED PROCESSING

FIELD OF THE INVENTION

The present invention relates broadly to a method and apparatus for exposing a processing catalyst to high frequency energy in the presence of an organic feed such as a hydrocarbon feed. Further, the invention is directed to pulsing high frequency energy to remove water and salt from organic feeds such as petroleum feeds.

BACKGROUND OF THE INVENTION

In all oil processes using catalysts, deactivation of the catalyst occurs due to poisoning of catalysts and due to coke formation on the catalyst. The precipitation of heavy metals, such as nickel, vanadium, iron, can also result in the deactivation of the catalyst. The accumulation of coke on the catalyst causes periodic (in case of cyclic operating plants) or continuous (for plants with a moving catalyst layer) regeneration of the catalyst. In some instances the plant must shut down to unload the catalyst from the reactor for catalyst regeneration. Some systems have a separate system for catalyst regeneration connected to the reactor. With traditional methods for regenerating the catalyst there is the loss of catalytic material, deterioration due to abrasion, and loss in activity. Microwave energy has been applied to catalytic hydroprocessing systems. However, these systems typically utilize a plasma initiator in the reactor resulting in more complicated hydroprocessing systems.

There is a need for a process that eliminates the need to remove the catalyst from the hydroprocessing reactor and extends the life of the catalyst. Further, there is a need for a less complicated system that does not require plasma initiators.

Prior to hydroprocessing organic feeds, the organic feed that comes from the oil field usually contains water. The oil must generally be free of water before it can be sold or transported in pipelines. Often the water is highly dispersed throughout the oil forming an emulsion. This emulsion is very expensive to separate. There is a need for cost effective method for removing trace amounts of water from the organic feed.

SUMMARY OF THE INVENTION

The present invention includes a method for processing an organic feed comprising the steps of exposing the organic material to a catalyst, and applying more than one pulse of electromagnetic radiation to at least a portion of said catalyst wherein each pulse of electromagnetic radiation is sufficient to raise the temperature of the catalyst above the temperature of the organic feed. The time between each pulse is sufficient to allow the catalyst to cool to a temperature of at least about the temperature of the organic feed. Preferably, the pulses are applied while the catalyst is in contact with the organic feed. The frequency between at least two pulses may be different. Further, the time between pulses may be different. Preferably, the electromagnetic radiation has a frequency of at least about 1 MHz. The electromagnetic radiation may have a frequency ranging from about 1 MHz to about 100 HHz. The electromagnetic radiation may be selected from the group consisting of VHF, UHF, microwave, infrared, and laser radiation. The pulse may have a duration ranging on the order of about $10^{-6}$ to about $10^0$ seconds. The time between pulses may range on the order from about $10^{-6}$ to about $10^2$ seconds. The steps of exposing the organic feed to the catalyst and applying more than one pulse to at least a portion of the catalyst are preferably effective for processing at least a portion of the organic feed. The processing may be selected from the group consisting of simple cracking, hydrocracking, hydrogenation, hydroisomerization, hydrodesulfurization, and reforming. The steps of exposing the organic feed to the catalyst and applying more than one pulse to at least a portion of the catalyst may be effective for reducing the formation of coke on the catalyst. Preferably, each pulse is sufficient to regenerate the activity of the catalyst. The organic feed may be selected from the group consisting of hydrocarbon liquids, hydrocarbon vapor, petroleum feed, liquified coal, dispersed coal, oil, crude oil, fractions of oil, naptha, gasoline, jet fuel, and combinations thereof.

The present invention also includes a method for dewatering an organic feed comprising the steps of applying a pulse of electromagnetic radiation to the organic feed sufficient to vaporize at least a portion of a water droplet contained in the organic feed to form a liquid-vapor water complex wherein the liquid-vapor water complex rises to the surface of the organic feed and forms a water complex, and removing the water complex from the organic feed. More than one pulse of electromagnetic radiation may be applied to the organic feed. More than one complex may combine to form a water droplet sufficient to fall to a bottom portion of the organic feed. In one embodiment, the pulse may be sufficient to vaporize water in the organic feed. The method may further comprise a heating pulse of electromagnetic radiation wherein the heating pulse creates a temperature gradient over the volume of the organic feed. The electromagnetic radiation may have a frequency of at least about 0.4 MHz. The electromagnetic radiation may a frequency ranging from about 0.4 MHz to about 100 HHz. Preferably, the electromagnetic radiation may be sufficient to induce salts contained in the organic feed to concentrate in the liquid-vapor water complex. The duration of the pulse may range on the order of about $10^{-6}$ seconds to about $10^1$ seconds. The duration of the pulse may range on the order of about $10^{-6}$ seconds to about $10^0$ seconds. The organic feed may be selected from the group consisting of hydrocarbon liquids, hydrocarbon vapor, petroleum feed, liquified coal, dispersed coal, oil, crude oil, fractions of oil, naptha, gasoline, jet fuel, and combinations thereof. The water may be removed from the organic feed by skimming. The electromagnetic radiation may be selected from the group consisting of VHF, UHF, microwave, infrared, and laser radiation.

Still further, the present invention includes a method for removing salt from an organic feed comprising the steps of applying a first pulse of electromagnetic radiation to the organic feed sufficient to heat water contained in the organic feed to increase the solubility of salt in the water and applying a second pulse sufficient to vaporize a portion of the water containing the salt to form a liquid-vapor complex and to bring the complex containing the salt to the surface of the organic feed to form a liquid complex, and removing the liquid complex from the hydrocarbon liquid. The electromagnetic radiation may have a frequency of at least about 0.4 MHz. Preferably, the electromagnetic radiation may have a frequency ranging from about 0.4 MHz to about 100 HHz. The duration of the first pulse may range on the order of about $10^{-6}$ seconds to about $10^1$ seconds. The duration of the second pulse may range on the order of about $10^{-6}$ seconds to about $10^0$ seconds. The organic feed may be selected from the group consisting of hydrocarbon liquids, hydrocarbon vapor, petroleum feed, liquified coal, dispersed coal, oil, crude oil, fractions of oil, naptha, gasoline, jet fuel, and combinations thereof. The water may be removed from the organic feed by skimming. The electromagnetic radiation may be selected from the group consisting of VHF, UHF, microwave, infrared, and laser radiation.

The present invention includes a reactor comprising a column having a channel therethrough and side walls that will reflect electromagnetic radiation. Also included is an electromagnetic radiation generator wherein the generator provides at least two pulses having different frequencies, and a window positioned on a side wall wherein the window is transparent to electromagnetic radiation and allows radiation from the generator to reach the channel. The electromagnetic radiation generator is positioned such that each pulse of electromagnetic radiation is introduced in the reactor at an angle and reflected over the length of the channel. The electromagnetic radiation generator may generate radiation selected from the group consisting of VHF, UHF, microwave, infrared, and laser radiation. The frequency of the electromagnetic radiation is preferably at least about 1 MHz. The frequency of the electromagnetic radiation may ranges from about 1 MHz to about 100 HHz. In a preferred embodiment, the walls of the reactor are stainless steel. The window may be ceramic.

Still further, the present invention includes a reactor comprising a column having a channel therethrough and side walls. The reactor includes a plurality of electromagnetic radiation generator spaced a distance apart from one another along the length of the column wherein each generator provides pulses of electromagnetic radiation. Also provided is a window for each generator positioned on the side wall wherein each window is transparent to electromagnetic radiation and allows radiation from the generator to reach the channel. The electromagnetic radiation generator may generate radiation selected from the group consisting of VHF, UHF, microwave, infrared, and laser radiation. The frequency of the electromagnetic radiation is preferably at least about 1 MHz. The frequency of the electromagnetic radiation may range from about 1 MHz to about 100 HHz. The walls of the reactor may be stainless steel. The window may be ceramic. Each generator may pulse electromagnetic radiation at a different frequencies. Each generator may generates at least two pulses of electromagnetic radiation having different frequencies.

Further, the present invention includes a reactor comprising a column having a channel therethrough and side walls. A plurality of electromagnetic radiation generators are spaced a distance apart from one another along the length of the column wherein each generator provides a band of radiation across a cross-section of the column along a portion of the length of the column. A window for each generator is positioned on the side wall wherein each window is transparent to electromagnetic radiation and allows radiation from the generator to reach the channel. The electromagnetic radiation generator may generate radiation selected from the group consisting of VHF, UHF, microwave, infrared, and laser radiation. The frequency of the electromagnetic radiation is preferably at least about 1 MHz. The frequency of the electromagnetic radiation may range from about 1 MHz to about 100 HHz. The walls of the reactor may be stainless steel. The window may be ceramic. Each generator may generate electromagnetic radiation at a different frequency. Each generator may generate bands of radiation that spans different lengths of the column.

The present invention also includes a dewatering device comprising a container for holding organic feed, an electromagnetic radiation generator wherein the generator provides at least two pulses having different frequencies, and a window transparent to electromagnetic radiation positioned on the container to allow electromagnetic radiation from the generator to reach at least a portion of the organic feed. The electromagnetic radiation generator may generate radiation selected from the group consisting of VHF, UHF, microwave, infrared, and laser radiation. The frequency of the electromagnetic radiation is preferably at least about 0.4 MHz. The frequency of the electromagnetic radiation may range from about 0.4 MHz to about 100 HHz.

The present invention includes a dewatering apparatus comprising a pipe for transporting an organic feed wherein a portion of the pipe is transparent to electromagnetic radiation. Also included is an electromagnetic radiation generator wherein the generator provides at least two pulses having different frequencies through the transparent portion of the pipe. The apparatus may include a drain on the pipe spaced a distance from the transparent portion for removing water from the organic feed after the organic feed has been treated with electromagnetic radiation. The electromagnetic radiation generator may generate radiation selected from the group consisting of VHF, UHF, microwave, infrared, and laser radiation. The frequency of the electromagnetic radiation is preferably at least about 0.4 MHz. The frequency of the electromagnetic radiation may range from about 0.4 MHz to about 100 HHz.

DETAILED DESCRIPTION OF THE PREFERRED EMBODIMENTS

Figure 1:
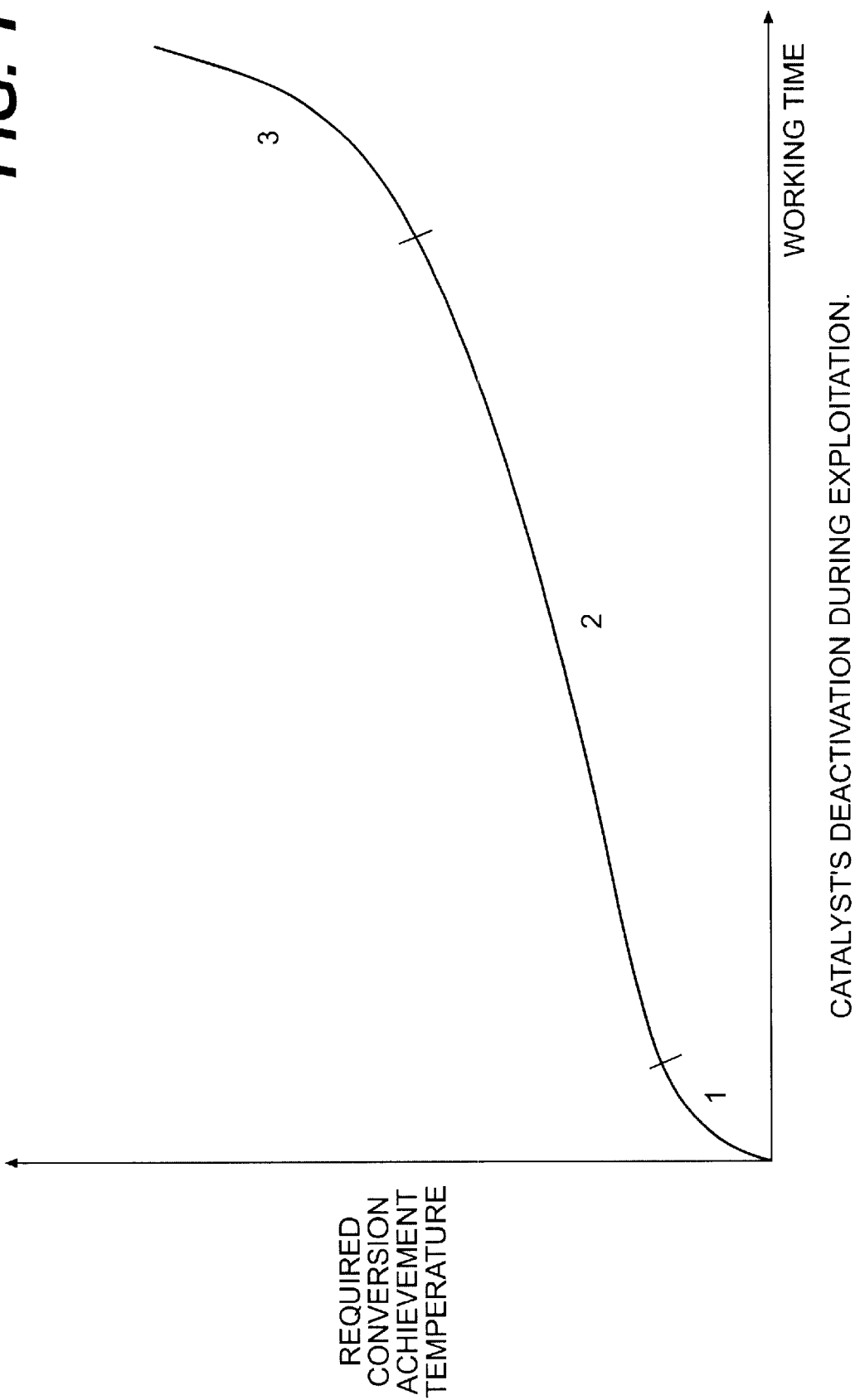
FIG. 1 is a plot showing the required temperature for conversion for a catalyst as a function of time.

All oil processes that use catalysts are complicated by catalyst deactivation. The deactivation is typically due to poisoning the catalyst with sulfur and due to coke precipitation on the catalyst. Further, the precipitation of heavy metals such as nickel, vanadium, and iron results in catalyst deactivation. The accumulation of coke catalyst requires regeneration of the catalyst. In cyclic operating plants the catalyst must be periodically regenerated and in plants with a moving catalyst layer, the catalyst must be continuously regenerated. Some procedures require the plant to shut down so the catalyst may be unloaded from the reactor followed by catalyst regeneration. Some systems have a cyclic system where the catalyst is transferred from the reactor to a regeneration column followed by the transfer of the catalyst to the reactor without shutting down the system. The regeneration column operates at high temperatures and requires additional power and cost to operate. When the catalyst is subjected to a regeneration process some of the catalyst material is lost, the catalyst particles experience deterioration due to abrasion, and the activity of the catalyst decreases. As a general rule, it is not possible to completely restore the catalyst activity during regeneration.

The time scale for the hydrocracking reaction is on the order of microseconds. The life-time of individual catalyst particles in reactor column is on the order of a second. In some technologies, the life of the catalyst is extended due to millisecond time scale contact with the organic feed.

There is a need for a system and process that avoids coking of the catalyst and eliminates the need for catalyst regeneration systems or columns. Further, there is a need for a system and process that does not interrupt the catalytic process by withdrawing the catalyst from a reactor. Additionally there is a need for taking advantage of the microsecond time scale of reaction for hydrocracking by selectively activating the catalyst in the reactor to maximize the activity of the catalyst in the reactor.

The above problems are solved by applying a high frequency field ("HF-field") to organic feeds in processing systems. As used herein, "organic feed" includes but is not limited to hydrocarbon liquids, hydrocarbon vapor, petroleum feed, liquified coal, dispersed coal, oil, crude oil, fractions of oil, naptha, gasoline, jet fuel, and combinations thereof. The raw material of the organic feed and the associated petroleum products are known to be good dielectrics. Catalysts activated for work in a reactor are also good dielectrics. However, coke and metal precipitation on the surface of the catalyst particles ("precipitation-deactivators") are conductors. When an electromagnetic field is applied to the catalyst in the organic feed, the heating of the precipitation-deactivators occur while organic feed remains at the initial temperature. The result is the rate of coke formation remains constant due to invariant rates of hydration and thermal cracking in oil crude. However, the rate of coke sublimation sharply increases due to the interaction of coke with hydrogen. This process causes the elimination or considerable reduction of coke amounts on the surface of the catalyst. The present invention can be used to suppress the coking of a catalyst during hydroprocessing and reforming.

Deactivation of the catalyst occurs when carbon material precipitates on the surface and in pores of the catalyst. The term "coke" as used herein, is given its ordinary meaning known to those skilled in the art and generally refers to the deposit of carbon on the surface of the catalyst that results in deactivation of the catalyst. The coke deposit may contain hydrogen as well as nitrogen. The C:N ratio may approach to 2, and the properties depend on the type of catalyst, the material being processed, and the conditions of the catalytic process.

Typically, catalysts are used in the hydroprocessing, reforming and cracking of oil. All of these processes are performed in the presence of a reducing gas such as hydrogen.

Hydroprocessing in the oil refining industry is the processing of oil in the presence of the catalyst and hydrogen under certain conditions. Hydroprocessing includes, but is not limited to, processes know as hydrocracking, hydroclearing, hydrogenation, hydroisomerization, hydrodesulfurization, and hydrodenitration. Hydrocracking is a process in which the molecular mass of the raw material is reduced. Typically the molecular mass of the material is reduced by at least 50% during hydrocracking. Hydroclearing is a process where the molecular mass of a small part (less than 10%) of the raw material is reduced. Virtually the molecular mass of the raw material has not changed substantially. Hydrodesulfurization is a process that removes sulfur from the raw material and hydrodenitration is a process that removes nitrogen from the raw material.

Various hydroprocessing technologies include preprocessing an organic feed to eliminate sulfur, nitrogen and metals that can contaminate reforming catalysts. Also important is the elimination of sulfur from kerosene, jet, diesel and furnace fuel. Other hydroprocessing systems include hydrogenation of olefinic and aromatic molecules. Further, hydroprocessing technologies may improve the quality of lubricating oil such as the color, color stability, storing stability at the expense of the resinification reducing, and reducing the acidity. The preprocessing of catalytically cracked gas-oil crude in a boiling layer can increase the output of liquid products, reducing catalyst consumption. Hydroprocessing can reduce corrosion by reducing the sulfur content in the organic feed. Preprocessing may reduce nitrogen, metals and aromatic substances contained in the raw material. Hydroprocessing systems are also important in reducing the sulfur content in stillage residuals of atmospheric and vacuum distillation systems to improve the fuel and prepare products for further processing and improving their conversion.

Catalytic reforming is a method of oil processing, in which naphtha ($C_5$, 28–200° C.) is passed through a series of catalytic reactors being under high temperature and moderate pressure (7–10 atm.) to increase the content of aromatic hydrocarbons or to increase the octane number in gasoline. As a general rule, the parent naphtha is subjected to a preliminary hydroprocessing step to eliminate impurities that inhibit the reaction or contaminate the reforming catalyst. Naphtha can be obtained directly from crude oil or by the fractionation of other oil processing products such as through coking. Fundamental reactions of reforming are dehydrogenation, naphthene isomerization, dehydrocyclization, isomerization of paraffins and hydrocracking.

Reforming plants generally produce motor fuels, such as gasoline, and aromatic compounds. During the reforming process, hydrogen is generated which can be used in other hydroprocessing steps.

Catalytic cracking is the thermocatalytic processing of the oil to reduce the molecular mass of the oil. The process is typically carried out at 470–530° C. and 70–370 kPa with a silica-alumina supported catalyst. The duration of raw vapor-catalyst contact about 2.5–5 s. Cracking is applied to gas-oils from straight-run distillations, vacuum gas-oils, fractions of products generated during the hydrocracking, coking, deasphalting. The most preferable raw material is that one having high content of naphthenic and paraffin hydrocarbons. Fundamental reactions of catalytic cracking are the cleaving of a carbon-carbon bond, isomerization, dealkylation, dehydrocyclization, polymerization, and condensation. The catalysts are typically sensitive to metal contamination. To prevent the catalyst from being contaminated the raw material can undergo hydroclearing to remove amounts of metals such as V, Ni, Cu, Fe, Na prior to catalytic cracking the material.

At temperature of 1000° C. the formation coke, C, goes according to the reactions:

$$2H_2O + C \Rightarrow CO_2 + 2H_2 - 18.0 \text{ kcal} \quad (1)$$

$$2H_2O + C \Rightarrow CO_2 + 2H_2 + 18.2 \text{ kcal} \quad (2)$$

During hydroprocessing and reforming, the last reaction is typical. The free energy change is calculated by formula $$\Delta F = RT\left(\ln\left(\frac{p_{CH_4}}{p_{H_2}^2}\right) - \ln K_p\right) \quad (2')$$

where $K_p$ is the reaction equilibrium constant. The evolving of free carbon corresponds to the inequality $\Delta F > 0$.

The reaction (2) describes interaction of methane and hydrogen. The thermal dissociation of hydrocarbon corresponds to the reaction $$C_nH_m = nC + \frac{m}{2}H_2 \quad (3)$$

The reaction (3) is an inconvertible one, since the elementary structures such as methane, propane, and butane are formed during the synthesis of hydrocarbons from carbon and hydrogen. Therefore, the reaction (3) should be considered together with (1) and (2). For hydroprocessing, equations (2) and (3) must be considered together.

In case of liquid fuel, the hydrocarbon part is usually described according to formula $C_nH_{1.5n}$, i.e. m=1.5n (see formula (3)). Assuming that methane only is generated, the balance between the parent and final products in (3) and (2) respectively is $$C_nH_m \Rightarrow \frac{m}{4}CH_4 + C\left(n - \frac{m}{4}\right)$$

Taking m into account, $$n - \frac{m}{4} = 0.625n > 0$$

The complicated catalytic dissociation of hydrocarbon is inevitably accompanied by evolution of free carbon in the form of coke. In a reducing atmosphere of hydrogen the equation becomes the following:

$$C_nH_m + pH_2 \Rightarrow nCH_4 + \frac{1}{2}(2p + m - 4n)H_2 \quad (4)$$

A necessary condition for the reduction in coke formation appears to be:

$$2p + m - 4n > 0 \quad (5)$$

This will vary depending on the type of hydroprocessing reactions.

The condition of type (5) is a necessary one, but not a sufficient one. The sublimation of carbon is provided by chemical reactions of types (1) and (2). It is necessary for these reactions to go at a comparatively high rate. Letting the rate constant of the reaction (3) be equal to $K_n$ results in n moles of free carbon being obtained from one mole of complicated hydrocarbon. The conversion rate for one mole of carbon (according to the reaction (2) is equal to $NsK_1$ $(K_pp_{CH}-p_H^2)$ where $K_1$ is the kinetic coefficient. If we omit methane contribution, coking does not occur, if the following inequality is fulfilled:

$$nK_n \leq K_1K_pNSp_{H_2}^2, \text{ or } p_{H_2} \geq \sqrt{\frac{nK_n}{K_1K_pNS}} \quad (6)$$

where N, S is the granules' concentration and the surface area of a granule covered by coke, respectively. If the hydrogen pressure a system is less than a critical value $$p_c = \sqrt{\frac{nK_n}{K_1K_pNS}}$$

then the accumulation of coke on the catalyst takes place. If $p_H < p_C$, coke is not only unaccumulated, but soot is also generated before the carbon into gaseous hydrocarbons.

The values of the constants $K_n$ and $K_1K_p$ and their dependence on temperature are known. $K_p$ follows the following equation:

$$\lg K_p = \lg\left(\frac{p_{CH_4}}{p_{H_2}^2}\right) = \frac{4732}{T} - 5,737 \quad (7)$$

$K_p$ is measured in $\text{atm}^{-1}$. Values for $K_p$ corresponding to the temperature range of 350–1500° C. are shown in Table I.

TABLE I

Values of equilibrium constants for the reaction (2)

| Temp., ° C. | $K_p$, atm$^{-1}$ | Temp., ° C. | $K_p$, atm$^{-1}$ |
|---|---|---|---|
| 350 | 43.441 | 950 | 1.763*10$^{-2}$ |
| 400 | 13.198 | 1000 | 1.304*10$^{-2}$ |
| 450 | 4.749 | 1050 | 9.870*10$^{-2}$ |
| 500 | 1.944 | 1100 | 7.677*10$^{-3}$ |
| 550 | 0.8863 | 1150 | 6.086*10$^{-3}$ |
| 600 | 0.4425 | 1200 | 4.922*10$^{-3}$ |
| 650 | 0.2383 | 1250 | 4.053*10$^{-3}$ |
| 700 | 0.1371 | 1300 | 3.393*10$^{-3}$ |
| 750 | 6.47*10$^2$ | 1350 | 2.880.10$^{-3}$ |
| 800 | 5.328*10$^2$ | 1400 | 2.478*10$^{-3}$ |
| 850 | 3.555*10$^2$ | 1450 | 2.158*10$^{-3}$ |
| 900 | 2.463*10$^2$ | 1500 | 1.903*10$^{-3}$ |

As shown above, more complicated gaseous hydrocarbons such as saturated carbons, ethane, propane, and butane can be generated concurrently with methane according to reaction (3). Non-saturated hydrocarbons can also be generated, although these processes are suppressible in a hydrogen atmosphere during hydroprocessing. Unfortunately, the equilibrium constants for these complicated hydrocarbons are unknown. However, it is likely that the evolution of these complicated hydrocarbons is limited because of necessity to include much greater number of carbon atoms and hydrogen molecules in the elementary processes. The formation of similar hydrocarbons can affect the sublimation of carbon at the expense of methane generation, owing to a concentration reduction on one hand, and possible free carbon generation due to the dissociation of the complicated hydrocarbons on the other hand. The water vapor and hydrogen equilibration of conversion reactions for some higher hydrocarbon are known values to those skilled in the art. The registration of the coke generation reactions and its sublimation is arduous enough and requires special consideration. However, it's necessary to keep in mind, that according to experimental data, methane only is produced, and there are no higher hydrocarbons among the reaction products at the temperature higher than 600° C. Seemingly, the kinetic coefficient $K_1$ poorly depends on temperature.

The interaction of methane homologs and saturated hydrocarbons with water vapor and hydrogen can be described using the following basic reactions:

conversion of ethane: $C_2H_6+2H_2O=2CO+5H_2-83.0$ kcal, (A1)

conversion of propane: $C_3H_8+3H_2O=3CO+7H_2-119.0$ kcal, (A2)

conversion of ethylene: $C_2H_4+2H_2O=2CO+4H_2-54.1$ kcal, (A3)

conversion of propylene: $C_3H_6+2H_2O=2CO+6H_2-97.0$ kcal, (A4)

hydrogenation of ethane: $C_2H_6+H_2=CH_4+15.6$ kcal, (A5)

hydrogenation of propane: $C_3H_8+2H_2=3CH_4+28.9$ kcal. (A6)

Table II shows values of the equilibrium constants for these reactions where $$K_{A_1} = \frac{p_{CO}^2 + p_{H_2}^5}{p_{C_2H_6} p_{H_2O}^2},$$

$$K_{A_2} = \frac{p_{CO}^3 p_{H_2}^7}{p_{C_3H_8} p_{H_2O}^3},$$

$$K_{A_3} = \frac{p_{CO}^2 p_{H_2}^4}{p_{C_2H_4} p_{H_2O}^2},$$

$$K_{A_4} = \frac{p_{CO}^3 p_{H_2}^6}{p_{C_3H_6} p_{H_2O}^3},$$

$$K_{A_5} = \frac{p_{CH_4}^2}{p_{C_2H_6} p_{H_2}},$$

$$K_{A_6} = \frac{p_{CH_4}^3}{p_{C_3H_8} p_{H_2}^2}.$$

$$K_{A_7} = \frac{P_{CO} P_{H_2}^4}{P_{CH_4} P_{H_2O}},$$

$$K_{A_8} = \frac{P_{CO}^2 P_{H_2}^2}{P_{CH_4} P_{CO_2}},$$

$$K_{A_9} = \frac{P_{CO} P_{H_2}^2}{P_{CH_4} P_{O_2}^{0.5}},$$

$$K_{A_3} = \frac{P_{CO_2} P_{H_2}}{P_{CO} P_{H_2O}},$$

TABLE III

Values of constants for reactions of methane conversion

| Temp., ° C. | A7 | A8 | A9 | A10 |
|---|---|---|---|---|
| 327 | $5.058*10^{-7}$ | $1.868*10^{-8}$ | $2.169*10^{12}$ | 27.08 |
| 427 | $2.687*10^{-4}$ | $2.978*10^{-5}$ | $1.028*10^{12}$ | 9.017 |
| 527 | $3.120*10^{-2}$ | $7.722*10^{-3}$ | $6.060*10^{11}$ | 4.038 |
| 627 | 1.306 | 0.5929 | $4.108*10^{11}$ | 2.204 |
| 727 | 20.33 | 19.32 | $3.056*10^{11}$ | 1.374 |
| 827 | $3.133*10^2$ | $3.316*10^2$ | $2.392*10^{11}$ | 0.9444 |
| 927 | $2.473*10^3$ | $3.548*10^3$ | $1.957*10^{11}$ | 0.6966 |
| 1027 | $1.428*10^4$ | $2.626*10^4$ | $1.652*10^{11}$ | 0.5435 |
| 1127 | $6.402*10^4$ | $1.452*10^5$ | $1.425*10^{11}$ | 0.4406 |

The structure of converted gas is determined by a position of the equilibrium of endent reactions (A7) and (A10). The reaction (A8) is derivative, and the reaction (A9) can be omitted, since in the temperature range of 327–1127° C., the $K_{A9}$ equilibrium constant is so great that the concentration of nonreacting oxygen is practically equal to zero in the equilibrium gas mixture. Added oxygen will react with hydrogen, generating water vapor.

The values of the equilibrium constants for complicated hydrocarbons (A1)–(A6) are much higher than for the

TABLE II

Equilibration constants for reactions of methane homologs and unsaturated hydrocarbons conversion by water vapor and hydrogen

| Temp ° C. | A1 | A2 | A3 | A4 | A5 | A6 |
|---|---|---|---|---|---|---|
| 327 | $3.805*10^{-7}$ | $5.686*10^{-8}$ | 0.1065 | $5.592*10^{-4}$ | $1.50*10^6$ | $4.62*10^{11}$ |
| 427 | $1.467*10^{-2}$ | 0.2015 | 69.759 | 49.678 | $2.03*10^5$ | $1.04*10^{10}$ |
| 527 | 43.281 | $11.775*10^4$ | $9.437*10^3$ | $2.757*10^5$ | $4.47*10^4$ | $5.90*10^8$ |
| 627 | $2.268*10^4$ | $1.331*10^8$ | $4.528*10^5$ | $2.394*10^8$ | $1.33*10^4$ | $5.98*10^7$ |
| 727 | $3.505*10^6$ | $1.716*10^{11}$ | $11.018*10^7$ | $5.530*10^{10}$ | $4.97*10^3$ | $9.15*10^6$ |
| 827 | $2.184*10^8$ | $6.084*10^{13}$ | $1.308*10^8$ | $4.780*10^{12}$ | $2.22*10^3$ | $1.97*10^6$ |
| 927 | $6.902*10^9$ | $8.175*10^{15}$ | $1.109*10^9$ | $1.988*10^{14}$ | — | — |

When the water vapor is doubled, methane homologs and olefins are almost completely converted at 400–500° C.

To complete the picture, the reactions of methane conversion include the following reactions:

$CH_4+H_2O=CO+3H_2-49.3$ kcal, (A7)

$CH_4+CO_2=2CO+2H_2-59.3$ kcal, (A8)

$CH_4+0.5O_2=CO+2H_2+8.5$ kcal, (A9)

$CH_4+H_2O=CO+3H_2+9.8$ kcal. (A10)

Table III contains the values of the equilibrium constants for methane reactions:

reactions of methane conversion with water vapor (A7)–(A10). According to experimental data, at temperatures higher than 600° C., only methane is present in products of the reaction, and higher hydrocarbons are absent.

There's definite clarity concerning $K_p$, but the situation with $K_n$ is slightly indefinite. First, though the reaction of catalytic dissociation is written by the simple formula (3), this is a general formula and there is a range of intermediate products, which also react, and there is a series of pathways resulting in the final product. While $K_p$ is understood and depends on the parent raw structure, it can only roughly be reduced to the dependence on n.

Turning now to the mechanism of coke generation. Coke generation is the most frequent reason for deactivation of catalysts in hydroprocessing, reforming and cracking. To keep the necessary conversion rate while minimizing coke precipitation it is necessary to increase the operation temperature of a process. Currently, increasing the temperature becomes difficult because of the power deficiency of the furnace and limited heat resistance of the furnace materials. As a result, large product losses are realized during hydrocracking. In cyclic plants they have to terminate the cycle in order not to reduce the product output.

Therefore evaluation of the rate of coke generation is necessary for designing a conventional reactor for the appropriate process. The rate of coke generation increases as the temperature in the reactor increases, the hydrogen partial pressure decreases, the conversion grade increases (for example, sulfur extraction at desulfurization), the boiling-point of the raw product increases, and as the content of cracked products in raw material increases. By the end of the cycle, the coke percentage in the catalyst can vary from 3–4% for light straight-run naphtha and up to 25% and more for residual oils. The selectivity of the catalytic process (e.g., reforming or cracking) can change with the growth of coke precipitation. Frequently it is economically justified to terminate the process before reaching the thermal limit of a plant. The catalyst must be regenerated to recover the activity of the catalyst by removing the accumulated coke precipitation from the surface of the catalyst.

Coke generation can begin under the same conditions with or without the presence of a catalyst, but under certain conditions the catalyst can accelerate the generation and precipitation of coke. The generation of coke particles on a catalyst in a gas-synthesis atmosphere (mixture of ~50% $H_2$, ~40% CO and $CO_2$, ~10% $CH_4$) has been previously studied. The presence of metals from the iron group in the catalyst causes increased coke generation. The presence of strong alkalis such as $K_2O$, increases the rate of coke generation. If the catalyst contains compounds such as $SiO_2$ and $Al_2O_3$, which are able to react with alkali, the basicity of the catalyst decreases significantly while the rate of free carbon generation remains low.

Catalysts for oil processing typically use aluminum oxide or alumina in η- or γ-form as a support. Further some catalysts utilize zeolites. The iron and sodium oxide contents are limited to: Fe (0.03–0.05 mass %), $Na_2O$ (0.03–0.09 mass %). The catalyst granules serve as a vehicle for the carbon particles, which growth occurs at the expense of carbon precipitation and fastening. The catalyst itself does not influence the rate of free carbon generation.

Catalysts for hydroprocessing are typically mixtures of transition metals dispersed over the surface of support. Both molybdenum and tungsten are typically used to provide high activity of the catalyst. Cobalt and nickel do not possess significant activity, but act as a promoter by increasing the activity of molybdenum or tungsten catalysts. Tungsten catalysts are usually promoted with nickel, and molybdenum catalysts are typically promoted with nickel or cobalt.

Table IV itemizes some chemical components and physical properties of the four typical catalysts of hydroprocessing. These include (1) a cobalt-molybdenum low density catalyst having particles of 3.2 mm diameter, (2) a nickel-molybdenum high density catalyst having particles of 1.6 mm diameter, (3) a cobalt-nickel-molybdenum catalyst having particles 1.3 mm long and of the same diameter, and (4) a cobalt-molybdenum catalyst having particles of 1.0 mm diameter, which contains silicon oxide and is intended for reactors with boiling or extended layer of the catalyst.

TABLE IV

Properties of typical hydroprocessing catalysts

| Chemical composition and properties Components (mass % of dry substance) | 1 | 2 | 3 | 4 |
|---|---|---|---|---|
| $MoO_3$ | 15.0 | 18.5 | 16.2 | 13.5 |
| CoO | 3.2 | — | 2.5 | 3.2 |
| NiO | — | 3.3 | 2.5 | — |
| $SiO_2$ | — | — | — | 4.0 |
| Physical properties | | | | |
| Specific surface ($m^2/g$) | 310 | 180 | 230 | 330 |
| Pores volume ($cm^3/g$) | 0.80 | .53 | 0.52 | 0.60 |
| Particles diameter(mm) | 3.2 | 1.6 | 1.3 | 1.0 |
| Average length (mm) | 5.8 | 4.6 | 4.1 | 3.3 |
| Fill weight ($g/cm^3$) | 0.58 | 0.83 | 0.74 | 0.70 |
| Average crushing strength per unit of layer length (kg/mm) | 1.91 | 1.41 | 1.50 | 1.00 |

The structure of catalysts listed in Table III is typically supplemented up to 100% with aluminum oxide and with small additives of $SO_4$ (0.3–2 mass %), $Na_2O$ (0.03–0.09 mass %) and Fe (0.03–0.05 mass %).

Fresh and ready hydroprocessing catalysts typically contain metals such as, Co, Ni, and Mo in oxide form. Within the reactor, these metals are transferred into the sulfide form to provide the required activity and selectivity of the catalyst.

At the present time, reforming catalysts typically contain an aluminum oxide support coated by precious metals. Aluminum oxide may be either the η or γ crystalline form.

The η-form contains more acid centers than the γ-form, and serves as a support for most of the monometallic platinum catalysts. It has more developed initial surface. During catalysis and regeneration, the surface area of the support is reduced. The diminution of the surface area limits the service life of the catalyst to only a few cycles.

The γ-oxide acidity less than the η-form, but is more thermostable and keeps the initial surface area during the exploitation and regeneration better than the η-oxide. The reforming catalysts based on γ-oxide can undergo some hundreds of regeneration cycles before replacement is necessary due to surface area reduction. The lower acidity of the catalyst being placed on γ-oxide is compensated by adding an appropriate amount of halogen to the catalyst.

Reforming catalysts typically have a specific surface area of 175–300 $m^2/g$ and a total pore volume (measured with water filling) of 0.45–0.65 $cm^3/g$. The catalysts particles typically have the form of cylinders or balls with a diameter of 1.6–2.1 mm. The crushing strength of these catalysts is around 1.3–3.2 kg/mm and the density is ranges from about 0.51–0.78 $g/cm^3$.

Various metals are used with reforming catalysts. Platinum is often used. Some reforming catalysts include rhenium to form a platinum-rhenium catalysts. Rhenium increases the stability of the catalyst when coke is generated, allowing the physical conditions of the process to be raised, while preserving the duration of the cycle to be the same as the monometallic platinum catalyst. Typically, platinum catalysts will contain other metals such as, tin, germanium, and lead. The loading of metals on the support are typically less than 1% by mass of the reforming catalyst.

Commercially available catalysts usually contain precious metals either in oxide, or in reduced and sulfurized form. If the catalyst is in the oxide form, the catalyst has to be reduced and sulfurized before being exposed to the organic feed. To use the catalyst, about 0.06% by mass of the catalyst is injected into each reactor after the reduction. For these purposes they usually use $H_2S$.

At present time amorphous and crystalline aluminosilicates are used as the cracking catalysts, and the most widely adopted ones are the very crystalline aluminosilicates known generally as zeolites. Industrial applications include both X and Y type zeolites having the structure represented by the formula:

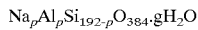

where p varies from 96 to 74 for X and from 74 to 48 for Y, and g ranges from 270 down to 250 as the aluminum content decreases. The industrial catalysts range from about 10 to about 20% by mass zeolite. The zeolite has an abrasion resistant aluminosilicate matrix that makes up the main mass of the catalyst. The matrix has a developed pore system, which provides the access to active zeolite centers residing inside the particles. Relative to cracked raw material the matrix is almost completely inert. The activity of industrial zeolite catalysts is conditioned solely by the presence of zeolite. The industrial catalysts are usually subjected to ionic interchange with ionic mixtures, rare-earth metals, ammonium, and magnesium ions or with mixtures of the latter.

In case of the fresh catalyst, the specific surface area of zeolites range from about 550–650 $m^2/g$, whereas the same parameter for the matrix depends on the type of the catalyst and varies from 40 to 350 $m^2/g$. Usually matrices with low specific surface are used, since such catalysts have reduced selectivity of coke generation and they are stable against the metal contamination. Industrial catalysts with a specific surface of about 100–400 $m^2/g$ typically have a total pore volume of 0.20–0.50 $cm^3/g$ and an average pore diameter of about 5.0–8.0 $m^{-9}$.

The comparison of temperatures for the beginning of coke generation under the same conditions with and without the catalyst show that the beginning of coke generation corresponds to the beginning of thermal cracking.

The breaking of the C—C-linkage followed by the formation of two large short-lived radicals is the primary reaction during cracking. Alkene molecules and relatively steady radicals such as H, $CH_3$, $C_2H_5$, are generated at the break on the weakest linkages. Interacting with a hydrocarbon molecule, the radicals will convert into $H_2$, $CH_4$, and $C_2H_6$, respectively, with the generation of a new radical which continues the chain reaction. Reactions of dehydrogenation, isomerization, polymerization and condensation of intermediate and parent substances occur simultaneously with cracking. As a result of the two last processes, there is so-called cracking residue that are fractions that typically have a boiling point higher than 350° C. and oil coke is generated. Cracking can only occur in presence of heat and the catalyst. Thermal cracking begins at about 300–350° C. From 370–425° C., the rate of cracking doubles as the temperature is increased by 12° C. From 450–600° C. the rate of cracking doubles as the temperature is increased by 14–17° C. An increase in duration of the process favors coke generation and accumulation.

Thermal cracking causes the formation of hydrocarbon radicals. Due to convection-diffusion interchange, the radicals reach the exterior surface of the catalyst particles. Because the radicals are short-lived, most radicals are only able to reach the exterior surface of the particle and not get into the pores of the particle. The initial soot particles can form on the surface of the particle. As discussed below, soot may form on any alkali center that may be present on the surface of the catalyst. Similar particles effectively seize radicals, and, in particular, those having a carbon atom at the extremity. The break-off of an adsorbed radical causes the growth of carbon on the catalyst. The growth of carbon on catalyst granule surfaces limits access to interior active centers, and eventually blocks these centers resulting in deactivation of the catalyst. Otherwise, when soot formation takes place directly on the catalyst's active surface (for example, in case of iron catalysts in Fisher-Tropche process) the carbon particles are generated inside the catalyst particles causing their enlargement and destruction.

It is necessary to discuss the extent of coke and metal precipitation in various technological processes. This value, naturally, depends on the type of raw material being processed since deactivation of the catalyst also decreases the selectivity of the process. As was mentioned above, during hydroprocessing, the coke content on the catalyst can vary from 3–4% by mass for the light straight-run oil and to over 25% by mass for residual oils. Further crude oils typically contain nickel and vanadium. The raw material having high content of these metals should be subjected to hydrodesulfurization or preliminarily upclassed before further stages. The amount of nickel and vanadium precipitated onto wasted hydroprocessing catalyst varies within a wide range and depends on the content of these metals in the raw material and the type of the catalyst and quality requirements for the product. Usually these metals account from about 10 to about 30% by mass of the wasted catalyst. Metals precipitate on the exterior surface of the catalyst, and the metal accumulation accelerates coke generation. Typical iron content ranges from about 0.1–1.0% by mass.

During catalytic reforming, the working cycle duration varies within a wide range depending on the rate of coke precipitation, which affects the product quality and is determined by parameters of the process and properties of raw material. The coke content on a bimetallic catalyst working in half-regenerative plant ranges from about 20–25% by mass. Coke precipitation during cracking reaches about 10–20% of the catalyst's mass.

Usually the regeneration of the catalyst is implemented when coke precipitation gets to about 1–2%. In this situation, the particle surfaces are not completely covered with coke and the catalyst retains its activity. Cracking as well as hydroprocessing of heavy raw material containing heavy metals such as Ni, V, and Fe, results in fast precipitation on the exterior surface of the catalyst. These ratios intensify the formation of coke and light gases. The regeneration of the exterior particle's surface passes at the expense of abrasion in the moving catalyst. Thus, the metal precipitation is removed, but it results in large losses and rises in the price of the catalyst. The metal content on the catalyst can reach 25% by mass.

The model for coke generation correlates with the observed kinetics of coke accumulation. FIG. 1 shows a typical curve for hydroprocessing catalyst deactivation. The plot can be divided into an initial stabilization region (1) where the reaction temperature increases by 5–10° C. during first days, a constant rate of deactivation region (2), and an accelerated deactivation section (3) where the rate of deactivation rapidly increases due to an avalanche coking effect and temperature growth.

In the initial stabilization region (1), radicals of hydrocarbon neutralize the alkaline centers initially available on the catalyst's surface. During the constant rate of deactivation, the centers become growth centers for soot particles, and gain mass linearly. During the region of accelerated deactivation, growth of centers results in increase of radical seizure causing nonlinear catalyst deactivation.

The coke generation mechanisms were discussed with reference to catalytic cracking. A possible classification method for these mechanisms is as follows:

1) Coke being obtained by the dehydrogenation of residual nonvolatile fractions or thermal cracking of the organic feed;
2) Coke being obtained by the noncatalytic method, but due to metals preliminary precipitating out of the organic feed onto the catalyst surface;
3) Coke remaining in the catalyst's pores; and
4) Coke being generated directly during catalytic cracking.

The last mechanism is considered to be the most preferable for catalytic cracking. The development of the coke generation concept discussed above is applicable to hydroprocessing and reforming.

The mathematical model for coke generation will now be discussed. Let $n_0$ be the concentration of raw molecules and $n_p$ be the concentration of radicals. If temperature of thermal cracking activation is $T_a$, then the following amount of radicals are generated per unit time:

$$n_0 B \exp\left(-\frac{T_a}{T}\right)$$

where B is constant depending on the amount of carbon atoms n in a raw molecule. $T_a$ is an average value.

For the same volume, the following number of radicals perish per unit time can be represented as $n_p n_0 C$, where C is the constant depending on n.

At equilibrium, we have the following concentration of radicals:

$$n_p = A_1 \exp\left(-\frac{T_a}{T}\right)$$

where $A_1 = B/C$ and depends on n. It is important that $n_p$ does not depend on concentration of raw molecules, while the inequality $n_p \ll n_0$ exists.

Let there be N particles of the catalyst in unit of volume where S is the exterior surface of a particle. A number of alkaline centers that interact with radicals are designated as f(c), where c is the alkaline elements concentration in the catalyst. If the elements are uniformly distributed over the volume of the catalyst particles and they are not surface-active, then $f(c) \sim c^{2/3}$. Putting in the mass transfer constant L, which depends on n, we can write the formula for the rate of soot accumulation on a single particle $$\left(\frac{dm}{dt}\right)$$

and in the volume unit of the catalys $$\left(\frac{dM}{dt}\right):$$

$$\frac{dm}{dt} = \alpha S f(c) n_p = A S f(c) \exp\left(-\frac{T_a}{T}\right), \quad \frac{dM}{dt} = N \frac{dm}{dt} \qquad (8)$$

where $A = \alpha A_1$ and depends on n.

The most interesting point is temperature dependency. Soot accumulation has an exponential character. If we use data on thermal cracking, $T_a \approx 25300K$ (by the formula $Ta = (\Delta T)^{-1} T^2 \ln 2$). The value of $T_a$ depends on the type of the raw material. However, the value of $T_a$ discussed above will be used for evaluations below.

Besides thermal cracking, a certain contribution to soot generation can be given by hydrocracking, which is catalyzed by acid centers of the catalyst. It is a very slow reaction and its contribution can also be calculated.

The balance between carbon precipitation and its chemical sublimation determines the rate of accumulation. To describe the rate, the expression for the rate of accumulation (2) and the formula (8) should be combined. If methane's influence is considered, the following equations results:

$$\frac{dm}{dt} = -K_1 NS\left(K_p p_{H_2}^2 - p_{CH_4}\right) + NSAf(c)\exp\left(-\frac{T_a}{T}\right) \qquad (9)$$

If the concentration of methane is small, the equation reduces to:

$$\frac{dm}{dt} = -K_1 NSK_p p_{H_2}^2 + NSAf(c)\exp\left(-\frac{T_a}{T}\right) \qquad (9')$$

At equilibrium, we have $$\frac{dm}{dt} = 0.$$

The following paragraph, with the help of this condition, will determine the equilibrium pressure of hydrogen $P_q$ with no increase of coke precipitation. If we use this notation, we can recreate the formula (9') for coke precipitation on the catalyst:

$$\frac{dm}{dt} = -NSK_1 K_p\left(p_{H_2}^2 - p_{CH_4}^2\right) \qquad (9'')$$

The inequality (6) defining conditions for nonexistence of coke generation was obtained above. For $K_p$, there is the expression (7). The coke generation velocity constant $K_n$ coincides with the right part of the expression (8) for dM/dt. The condition (6) granting (7)–(9) can be written as:

$$p_{H_2} \geq p_C = \sqrt{\frac{n}{K_1 K_p} A f(c)} \exp\left(-\frac{T_a}{2T}\right) \qquad (10)$$

Taking into account that $K_p$ depends on T, we can explicitly extract the expression for $p_c$:

$$p_c = C \exp\left(-\frac{T_a - T_p}{2T}\right), \qquad (11)$$

where $T_p = 4732K$ (see (7)). Since $T_a - T_p > 0$, the pressure $P_c$ is an increasing function of T. It means if at some temperature the condition (10) is met and coke is not evolved, the condition (10) is broken as the temperature rises and the system pressure remains the same and coke evolving begins.

This picture is correct if the temperatures of the catalyst particles and the raw materials are identical. In this case it is necessary to analyze the situation, when the temperature heterogeneity arises in the reactor, and namely, when the temperature of the catalyst particles exceeds the temperature of the raw material being processed. Let $T_1$ be the temperature of the raw material in the reactor, and $T_2$ is the temperature of the catalyst particles. Then the condition (6) can be represented as (analog to (9)–(10)):

$$p_{H_2} \geq p_C = C \exp\left(-\frac{T_a}{2T_1} + \frac{T_p}{2(T_1 + \Delta T)}\right) \quad (12)$$

where $T_2=T_1+\Delta T$. It's obvious the value of $p_C$ is the decreasing function of the catalyst overheating ($\Delta T$). In the range of 300–350° C., if $\Delta T \sim 70°$ C., the value of $p_C$ is reduced by half. The rate of chemical sublimation increases 4 times (see 9'). Qualitatively the situation with coke generation looks as if hydrogen pressure in a system is increased by 2 fold.

The value of hydrogen pressure increases for suppressing the coke generation and depends on many parameters such as process temperature, pressure, and raw material structure. A 2 fold increase of hydrogen pressure is usually more than enough to suppress coke generation.

It's appropriate to study the formula (9") closer. Recreating formula (9") provides:

$$\frac{dm}{dt} = -[NSK_1K_p(p_{H_2} + p_C)](p_{H_2} - p_C).$$

If the difference $(P_{H_2}-P_C)$ changes its sign, and taking into account the expression:

$$\left|\frac{p_{H_2} - p_C(T_1 + \Delta T)}{p_{H_2} - p_C(T_1)}\right| = K,$$

the rate of hydrosublimation at the temperature of $(T_1+T)$ will be K times greater than its rate of precipitation at temperature $T_1$. This expression is important when choosing the processing time for removing coke from the catalyst. In this case, the period when the catalyst is processed in the field is K times less than the working time for coke accumulation.

With the above concepts developed, the effect of exposing a coked catalyst to a high-frequency electromagnetic field will be discussed. Coke is a good conductor right up to frequencies of $\sim 10^{14}$ s$^{-1}$ and its resistivity amounts to $\rho=0.83\times 10^{-3}$ $\Omega$cm at a temperature of 500° C., and $$\frac{1}{\rho}\frac{\partial \rho}{\partial T} \sim 0.9 \times 10^{-4} \text{grad}^{-1}$$

For oil coke the value of $\rho$ can increase 2–3 times depending on the generation conditions.

Catalysts do not contain metals in the pure state. The metals are typically found in sulfide or oxide forms. The catalyst support is also a dielectric.

When the catalyst is working, the accumulation of other conducting components such as metals like Ni, V, and Fe occurs on the surfaces of catalyst particles. The metals exist in heavy oil fractions as metaloorganic compounds, which dissociate during hydroprocessing or cracking, and the metals precipitate onto the catalyst surface. The metal accumulation causes the acceleration of coke generation.

When the catalyst is working during hydroprocessing or cracking, a conducting material precipitates on the surface and in the pores of the catalyst particle. Assuming the catalyst particle is exposed to a high-frequency electromagnetic field, the absorption rate in the conducting surface layer of catalyst particle can be determined. For simplification, the particles are assumed to be spherical with a radius R and have a thickness h of the conducting layer. The depth of the field penetration into the layer is defined by the formula $$\delta = \frac{c}{\sqrt{2\pi\sigma\omega}} \quad (13)$$

where $\sigma=\rho^{-1}$ is the coke material conductivity, $\omega=2\pi\nu$, and c is the speed of light.

In further evaluations, frequencies in the MHz-range, beyond the radio transmission frequencies, will be used: $\nu_1=1.76$ MHz, $\nu_2=7.04$ MHz and $\nu_3=28.16$ MHz. $\sigma_1=1.2$ mm, $\sigma_2=0.6$ mm and $\sigma_3=0.3$ mm respectively. As a general rule, the thickness of surface precipitation does not exceed 30% of the catalyst's mass, i.e. the surface layer's thickness does not exceed 0.1 R. Taking into account the sizes of the catalyst particles, the precipitation thickness equates to the value of more than 0.1 mm. Thus, the penetration depth is much greater than the thickness of the coke covering. Therefore, the field relaxation in the surface layer may be omitted in order to explain the field structure within a catalyst particle. However, when defining the radiation absorption for a particle, this relaxation is fundamental, as they are unambiguously dealt with each other. It is also necessary to consider, that the wavelength is much greater than the size of the particle. Hence, to describe the absorption of the electromagnetic field, it is possible to use Raleigh's theory on absorption of electromagnetic waves by small particles.

The absorption section for a spherical particle with radius of R is $$\sigma_a = \frac{9\omega V \varepsilon''}{c}\left(\frac{1}{|\varepsilon|^2} + \frac{\omega^2 R^2}{90c^2}\right) \quad (14)$$

where V is a volume of absorptive area (i.e. the volume of coke relative to one granule), $\in''$ is the imaginary part of the dielectric permeability $\in$ of the conducting covering. For conductors in the low frequency range, which are low in comparison with plasma frequency, the following approximation is made:

$$\varepsilon = i4\frac{\pi\sigma}{\omega} = i\varepsilon'' \quad (15)$$

where i is the imaginary unit. Taking coke conductivity and granules sizes of R=3 mm, the second bracketed term on the right of the formula (14) considerably exceeds the first one. Let's put in $\psi$, the relative coke layer thickness on the surface of the catalyst particle relative to the radius of the particle. The formula for the absorption section can be rewritten as $$\sigma_a = \frac{3\omega^3 V R^2 \varepsilon''}{10c^3} \varphi \qquad (16)$$

For the two frequencies mentioned above, $\sigma_{a_1}=0.9\times10^{-6}$ $\psi(cm^2)$, $\sigma_{a_2}=1.5\times10^{-5}$ $\psi(cm^2)$, $\sigma_{a_3}=0.6\times10^{-4}$ $\psi(cm^2)$.

The heat-evolving power for a particle is defined by the formula $$W = \sigma_a I, \qquad (17)$$

where I is the intensity of electromagnetic radiation:

$$I = \frac{Q_e}{S},$$

where $Q_e$ is the emitter power, and S is the area of the radiation flow section.

For estimations, the following values are used: $Q_e \approx 250$ KWt, $S=10^2$ cm$^2$, and $I=2.5\times10^3$ Wt/sm$^2$. For the frequencies mentioned above we have: $W_1=2.5\times10^{-3}$ Wt; $W_2=0.4\times10^{-1}$ Wt and $W_3=0.15$ Wt.

To define the probable temperature growth on the surface of the catalyst particle the following formula may be used:

$$\Delta T = \frac{W}{4\pi R \mathit{æ}}, \qquad (18)$$

where æ is the heat conductivity for the environment of the particle. The characteristic fixing time for the temperature field is evaluated by the formula $$\tau \approx \frac{R^2}{\chi}, \qquad (19)$$

where $\chi$ is the temperature conductivity of the external environment relative to the granule and is represented by the formula:

$$X = \frac{\mathit{æ}}{c\rho},$$

where $\rho$ is the density and c is specific heat at the constant pressure for the mentioned medium. Since the pressure differs for different technologies, it is important to note, that x does not strongly depend on pressure and is inversely proportional to the pressure.

For estimations, the following values are used: $\mathit{æ} \approx 2.8 \cdot 10^{-4}$ W/(cm·grad) and, $\chi \approx 0.02$ cm$^2$/c at the pressure of 10 atm, methane. For granules with radius of 1 mm, the characteristic time or the thermal relaxation $\tau \approx 0.5$ s.

Using the values of the heat-evolving power for the frequencies mentioned above, $$\Delta T_1 = 7°\psi, \Delta T_2 = 110°\psi, \text{ and } \Delta T_3 = 1750°\psi, \qquad (20)$$

the values of $\psi$ can be to found using data for extreme coke and metals precipitation. The change of coke content from 3% by mass to 25% by mass corresponds to the interval from 0.01 to 0.1 for $\psi$. The data generalization through the value of $\Delta T$ according to the formulae (20) is shown in Table V.

TABLE V

Temperature growth for catalyst particle surface.

| Coke precipitation | $\phi$ | $v_1 = 1.76$ MHz | $v_2 = 7.04$ MHz | $v_3 = 28.16$ MHz |
|---|---|---|---|---|
| 3% | $10^{-2}$ | 0.07° C. | 1.1° C. | 17.5° C. |
| 25% | $10^{-1}$ | 0.7° C. | 11° C. | 17.5° C. |

The data analysis shows, that at the rate of electromagnetic field flow being equal to 250 kWt the technological application can get the frequency $v_3=28,16$ MHz. The lower frequency $v_2$ can only be used in case of the field amplification.

According to formulas (15)–(18), the temperature of the surface of a catalyst particle increases with frequency as $\omega^2$. Therefore, not only $v_3$ frequency, but also higher frequencies can be used.

It is important to evaluate the depth of the field penetration into the catalyst matrix. Considering only the absorption in the surface layer of the particle, it is possible to use formula (16) for the absorption section. The depth of penetration into the matrix is given by the formula $$1_p = \frac{1}{n_g \delta_a},$$

where $n_g$ is the concentration of the catalyst particles. For simplification, $n_g=(2R)^{-3}$ in case of dense particle arrangement. Selecting the maximum value for $\sigma_a(\sigma_{a\ max}=0.6\times10^{-5}$ cm$^2$) and $R=10^{-1}$ cm, $1_{p\ min}=1.3\times10^3$ cm=13 m is obtained.

Thus, any catalytic conversion plant possessing the reasonable sizes is transparent for HF-field. Certainly, here only absorption on coke is taken into account. The metal precipitation may slightly change the numerical evaluations, but the qualitative conclusions will remain.

As was indicated above, the processing in the field period for the catalyst is defined by expression:

$$K = \left| \frac{p_{H_2} - p_c(T_1 - \Delta T)}{p_{H_2} - p_c T_1} \right|.$$

If the coke accumulation time is equal to $t_H$, then the period of processing is $t_H$: K. For finding K, it is necessary to have the explicit function of pressure $P_C(T)$, which is measured experimentally.

Table V shows that at the low level of coke precipitation, 3 mass %, the heating of the particle surface is not a sufficient measure for the erosion of coke precipitation. If more intensive coke clearing is required for the particles, higher frequency fields other than those produced in Table IV may be used.

The present invention observes the possible selective acceleration of the erosion of coke precipitation on catalyst particles using an electromagnetic field in the MHz-HHZ range. This process can be realized in frequency of 28,16 MHz and higher. The above principles may be applied to hydroprocessing and reforming to gain the conditions of coke non-accumulation or accelerated hydrosublimation of coke precipitating on catalyst particle surfaces.

The present invention provides increased control over coke precipitation on the catalyst particles by the use of electromagnetic fields.

As discussed above, catalyst systems for processing an organic feed generally consist of a reactor vessel or column in which the catalyst is introduced with the organic feed. The organic feed is processed in the reactor by exposing the feed to the catalyst at high temperatures. Typically the organic feeds are introduced through the catalyst stream in route to the reactor. Much of the cracking of the organic feed occurs in a dispersed catalyst phase in the transfer line to the reactor. Typically a sufficient part of the organic feed is not vaporized and the unvaporized portion quickly cokes the catalyst choking its active area. Once the active area of the catalyst is covered with coke, the catalyst loses its activity and must be regenerated.

The inactive catalyst is transferred to the reactor vessel to a regeneration vessel in which the catalyst is heated at very high temperatures to remove coke formation on the surface of the catalyst. The regenerated catalyst is then sent to the reactor and the increased temperature of the catalyst results from the regeneration process is used to catalyze the cracking or hydroprocessing reaction in the reactor.

After the injection of hot catalyst into the reactor the temperature of the catalyst is going to decrease in a few milliseconds and the relative internal pressure of the catalyst particles in the reactor is going to become negative. The heat or thermal energy in the catalyst will be transferred to the organic feed and vaporize part of the organic feed. The vaporized organic feed will migrate in the catalyst pores due to the pressure gradient that is created. Once in contact with the catalyst, the catalytic reaction such as cracking will take place. As a result of its endothermic character, the temperature of the particle decreases even more and the organic feed molecules are maintained in the catalyst particle, effective blocking the pores of the catalyst. Further, the decreased temperature of the catalyst particle reduces their catalytic activity and provokes the formation of coke on the surface and the pore volume of the particle.

Figure 2:
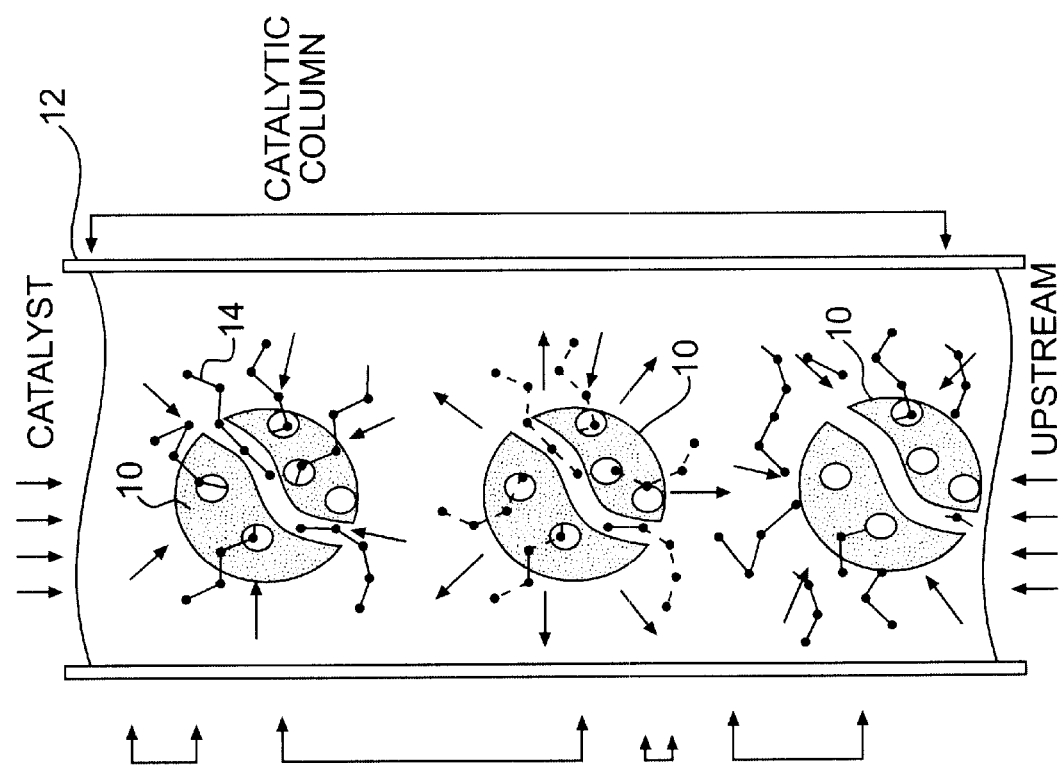
FIG. 2 is a diagram showing the mass exchange in the classical system.

FIG. 2 illustrates the mass exchange in the classical system. FIG. 2 shows a catalyst particle 10 in a reactor 12, exposed to an organic feed 14. The activity of the fresh catalyst decreases during the process. Effectively, the drop in activity takes place in a very short period of time at the beginning of contact with the organic feed. This period is sufficiently less than the particles lifetime in the reactor. Since the catalyst particle loses activity in the initial stages of being exposed to the organic feed in the reactor, after the relatively long period of time the particle remains the reactor, the particle remains passive and get covered by coke. The coke covered particle must be removed to the regeneration column to remove the coke formation.

There is a need for a system that reduces coke participation on the catalyst without withdrawing the catalyst from the reactor for regeneration. Present invention broadly relates to applying a high frequency-field to processing organic feeds. More particularly, the present invention is related to selectively applying pulses of a high frequency field to catalyst particles such that the catalyst particles maintain their activity while in the reactor and while they are in contact with the organic feed.

As discussed above, organic feeds such as oil and petroleum products are known to be good dielectrics. Further, activated catalysts used in processing reactions are also good dielectrics. However, coke and metals that have participated on the surface of catalysts are conductors. An electromagnetic field is applied to the catalyst the heating of coke and metals participated on the catalyst occurs while the oil or organic feed remains at the initial temperature. The rate of coke formation remains constant due to invariant rates of hydration and thermal cracking in crude oil, however, the rate of coke supplemation sharply increases due to its interaction with hydrogen. This causes the elimination or considerable reduction of coke formation on the catalyst.

The present invention can be used for the suppression of coke formation during various processing reactions and reforming of organic feeds.

The process in accordance with the present invention allows for the reduction and energy and time costs due to the regeneration of a deactivated catalyst and conventional systems.

Figure 3:
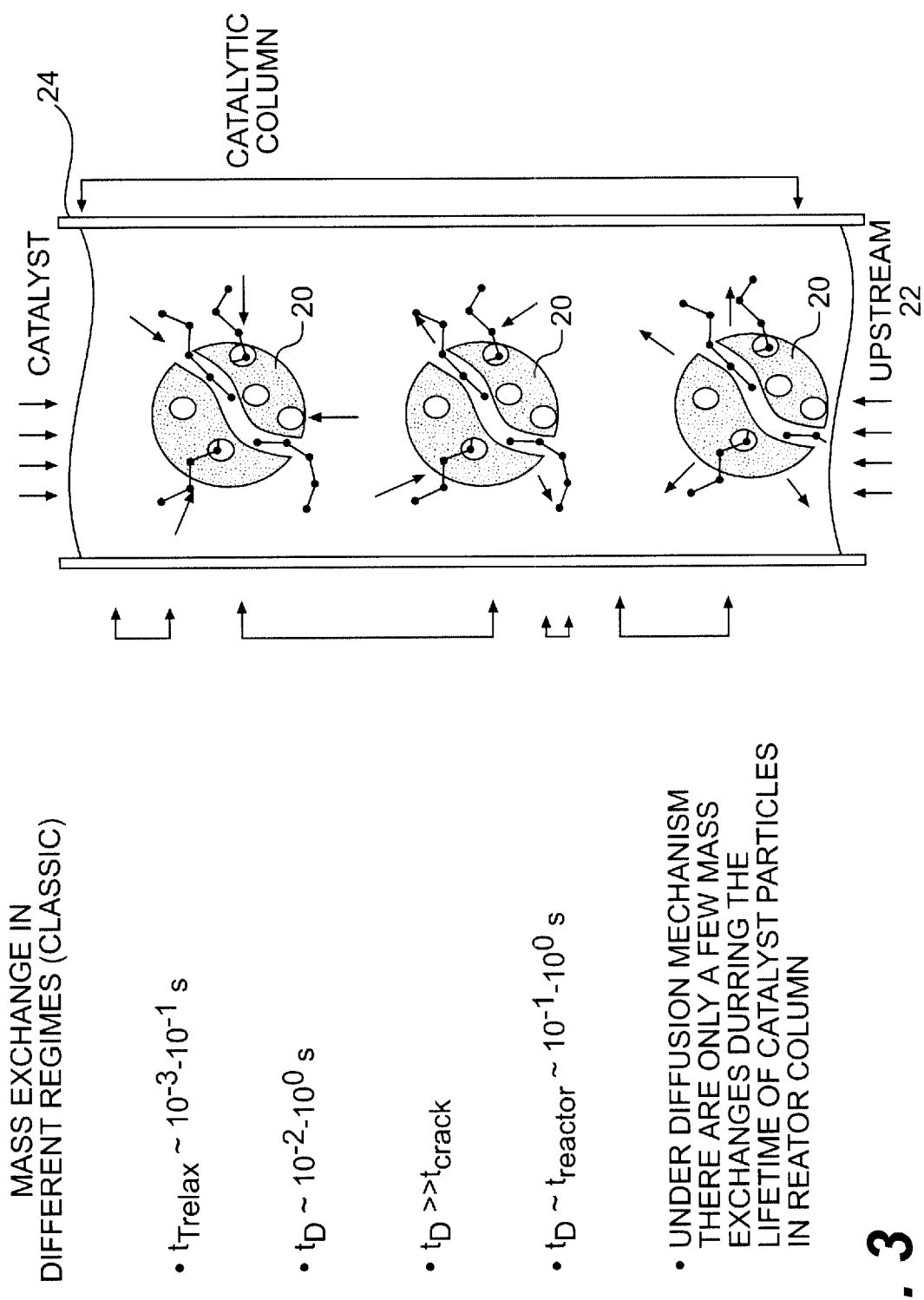
FIG. 3 is a diagram illustrating a scheme of mass exchange in the present invention.
Figure 4:
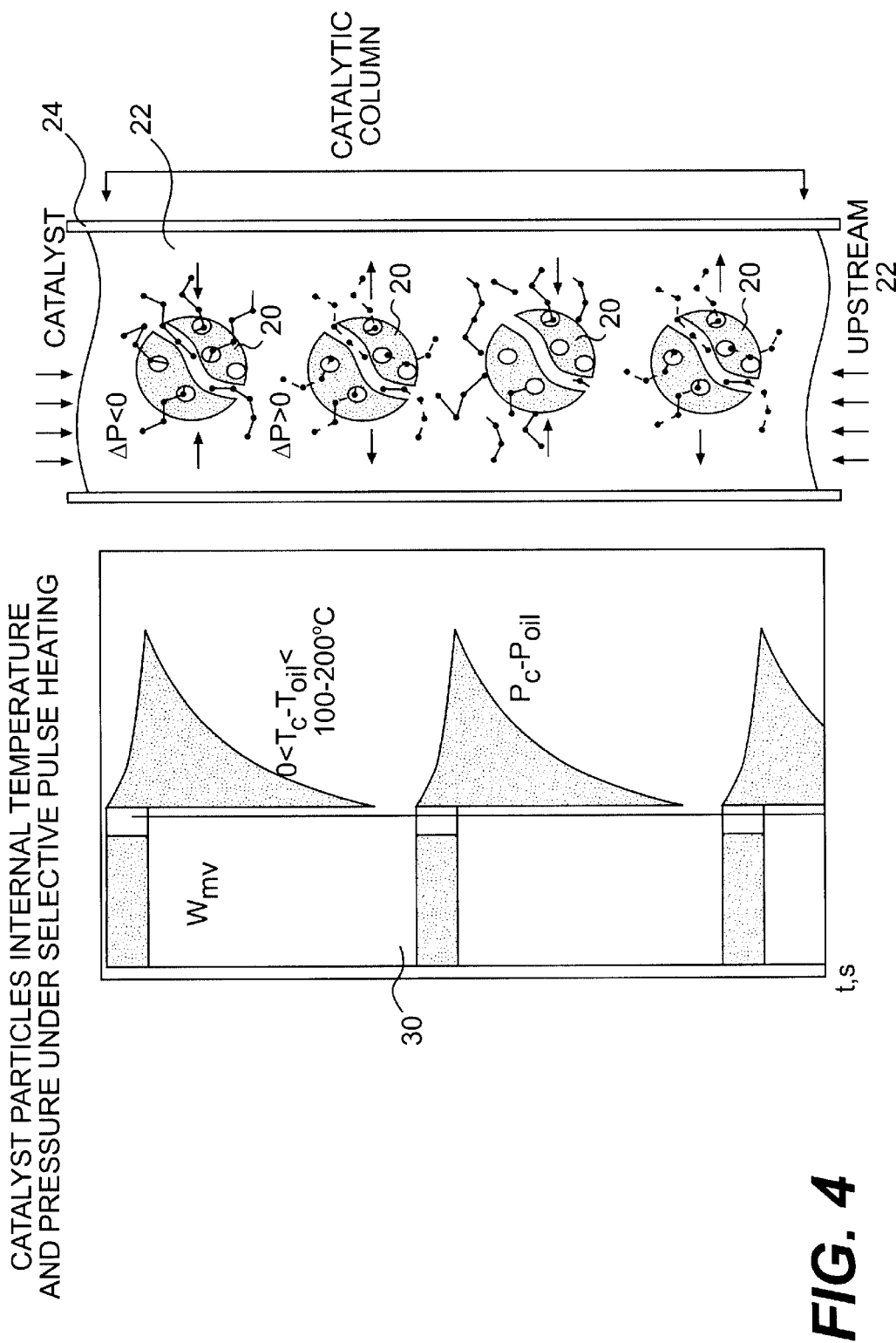
FIG. 4 is a diagram illustrating the internal temperature and pressure of the catalyst particles under electromagnetic pulse heating.
Figure 5:
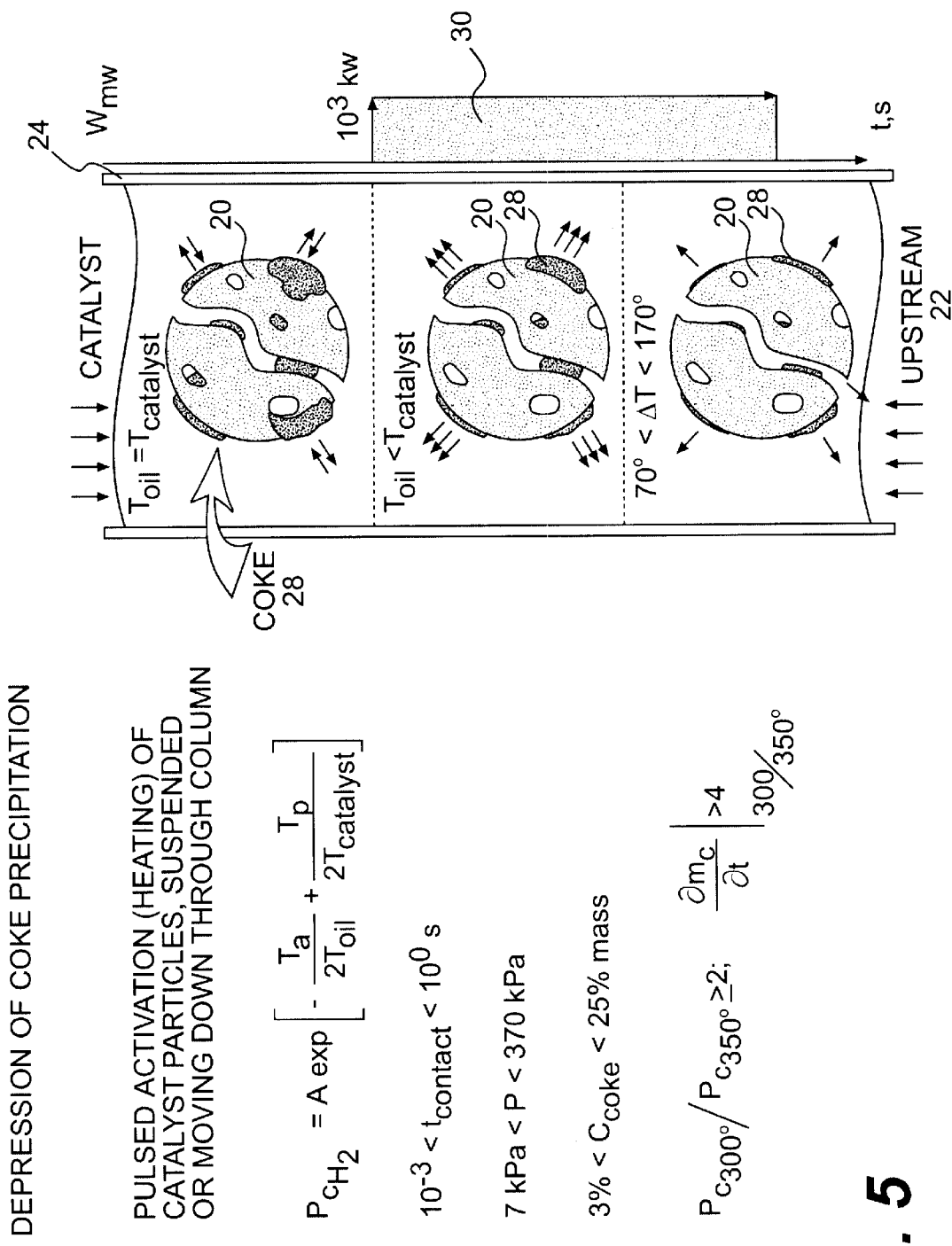
FIG. 5 is a diagram illustrating a scheme for the depression of coke precipitation.

With reference now to FIGS. 3–5, these figures show a catalyst particle 20 exposed to an organic feed 22 in a reactor 24, under the influence of electromagnetic radiation. Upon injection of a hot catalyst into the reactor with an organic feed, the temperature of the catalyst goes down within a few milliseconds and the relative internal pressure of the catalyst particles become negative. During this time, heat or thermal energy is transferred from the catalyst particles to the organic feed. At this point, parts of the oil are vaporized and due to the pressure gradient the organic feed molecules are able to get into the pores of the catalyst particle. Upon contact with catalyst particle, the processing reaction such as cracking takes place. These catalytic reactions are generally endothermic and as a result, the temperature of the particle decreases until the hydrocarbon molecules are deposited on the catalyst particle. The relatively negative particle temperature decreases the catalytic activity of catalyst particles itself and provokes the formation of coke 28 on the surface and in the pore volume of the catalyst particle 20 resulting in deactivation of the catalyst particle.

At this point, as illustrated in FIGS. 4 and 5, a selective pulse 30 of electromagnetic radiation selectively heats the catalyst particle 20 to a temperature that is higher than the surrounding organic feed 22. The pulse of electromagnetic radiation is preferably sufficient to raise the temperature of the catalyst above the temperature of the organic feed. Preferably, the pulse is sufficient to vaporize a portion of the organic feed surrounding the catalyst particle. The duration of the pulse may vary depending on the organic feed, the catalyst, and the frequency of the pulse. In a preferred embodiment the pulse of electromagnetic radiation is at least about 1 MHz. Still further, the pulse of electromagnetic radiation may range from about 1 MHz to about 100 HHz and is applied for a time on the order of about $10^{-6}$ seconds to about $10^0$ seconds. The time between pulses may vary depending on the organic feed, the catalyst, and the characteristics of the pulse. In a preferred embodiment the time between pulses is long enough to allow the catalyst particle to cool to a temperature that is about the same temperature or lower of the organic feed. In a preferred embodiment, the time between pulses ranges on the order of about $10^{-6}$ seconds to about $10^2$ seconds.

The source of the electromagnetic pulse may be very high frequency (VHF), ultra high frequency (UHF), microwave, infrared, or laser radiation.

The hot catalyst particles effectively generate a high relative internal pressure and forces the coke and hydrocarbon feed participation on the surface of the particle off of the surface and out of the pore volume.

As shown in FIG. 5, at the end of the electromagnetic pulse 30, the hot particle 20 begins to cool and comes in contact with vaporized organic feed molecules. The relative pressure of the catalyst particle becomes negative and a new fresh portion of feed puts the catalyst particles under pressure gradient. Upon contact with the hot catalyst particle, a catalytic reaction takes place. The catalyst particle eventually cools to a temperature such that the catalytic reaction does not occur and coke begins to form on the catalyst particle. At this point, another pulse of electromagnetic radiation is applied to the catalyst particles to heat the particles to a temperature and internal pressure above the temperature and pressure of the organic feed and thus the process of heatiig the catalyst to remove the cracked organic feed and to remove coke and other deposits from the catalyst is repeated.

Figure 6:
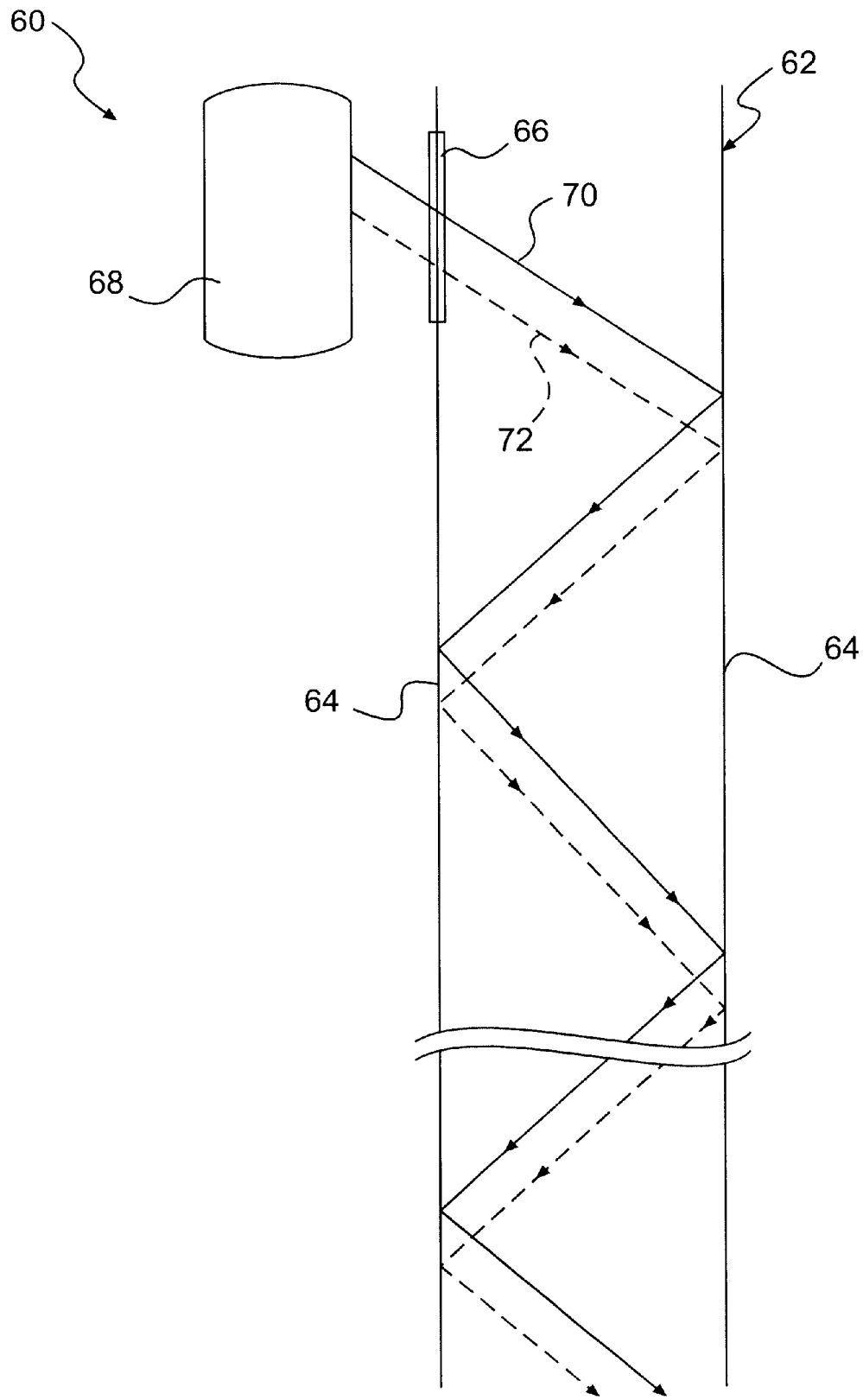
FIG. 6 is a diagram illustrating an embodiment of a reactor in accordance with the present invention.

Turning now to FIG. 6, there is shown a reactor 60 in accordance with one embodiment of the present invention. The reactor has a column 62 with side walls 64. A window 66 that is transparent to electromagnetic radiation is located on the wall 64 of the reactor 60. An electromagnetic radiation generator 68 is positioned such that electromagnetic radiation passes from the generator 68 through the window 66 and into the column 62. Preferably, the electromagnetic generator can deliver different pulses of radiation having different frequencies, represented by the reference numerals 70 and 72. Preferably, the walls of the column reflect electromagnetic radiation and the generator 68 is positioned to provide pulses of radiation 70 and 72 at an angle in the reactor. The pulses of radiation 70 and 72 will be reflected off the internal walls of the column. In this way the pulses of radiation will travel along the length of the column.

The column may take on a variety of shapes and configurations. The column may be cylindrical. The source of electromagnetic radiation may be from VHF, UHF, microwave, infrared or laser radiation. The window 66 must allow a portion of the radiation to enter the column. Preferably, the window is made of a ceramic material. The material used for the window 66 depends on the source of electromagnetic radiation. These materials are well know to those skilled in the art. The column should reflect at least a portion of the entering electromagnetic radiation. Preferably, the column is made of stainless steel.

Figure 7:
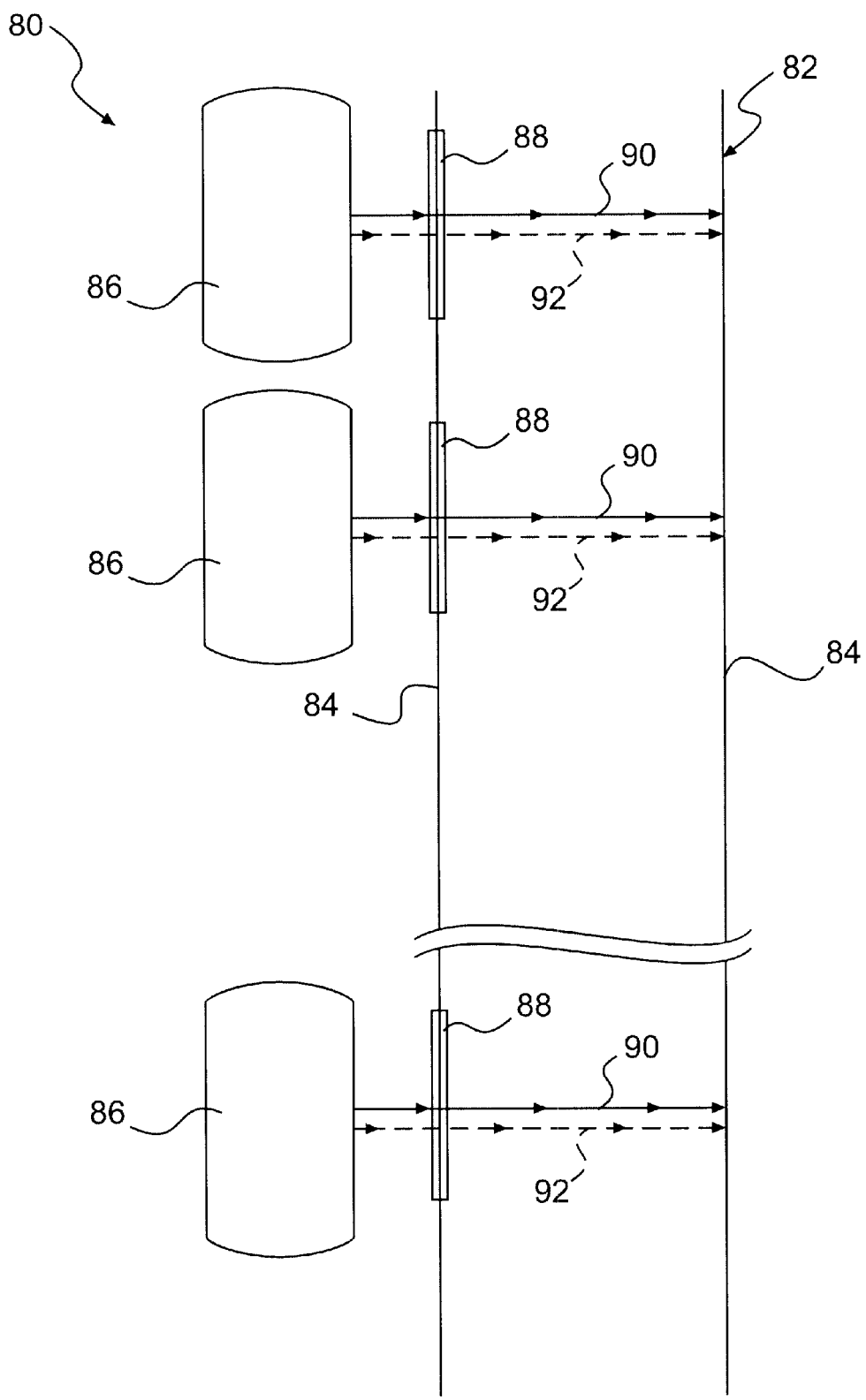
FIG. 7 is a diagram illustrating another embodiment of a reactor in accordance with the present invention.

With reference now to FIG. 7, a reactor 80 in accordance with another embodiment of the present invention is illustrated. The reactor 80 has a column 82 with side walls 84. A plurality of electromagnetic radiation generators 86 are positioned along the length of the column 82. For each generator 86, there is a window 88 that is transparent to electromagnetic radiation. Preferably each generator 86 delivers at least two pulses of different frequencies, 90 and 92, respectively, to the column 82. The generators should be spaced a distance apart along the length of the column to allow for catalyst regeneration. This configuration allows for control of the catalyst temperature as the catalyst travels along the length of the reactor. Each generator 86 may deliver a pulse having the same frequency as the other generators or the frequencies may be different.

Figure 8:
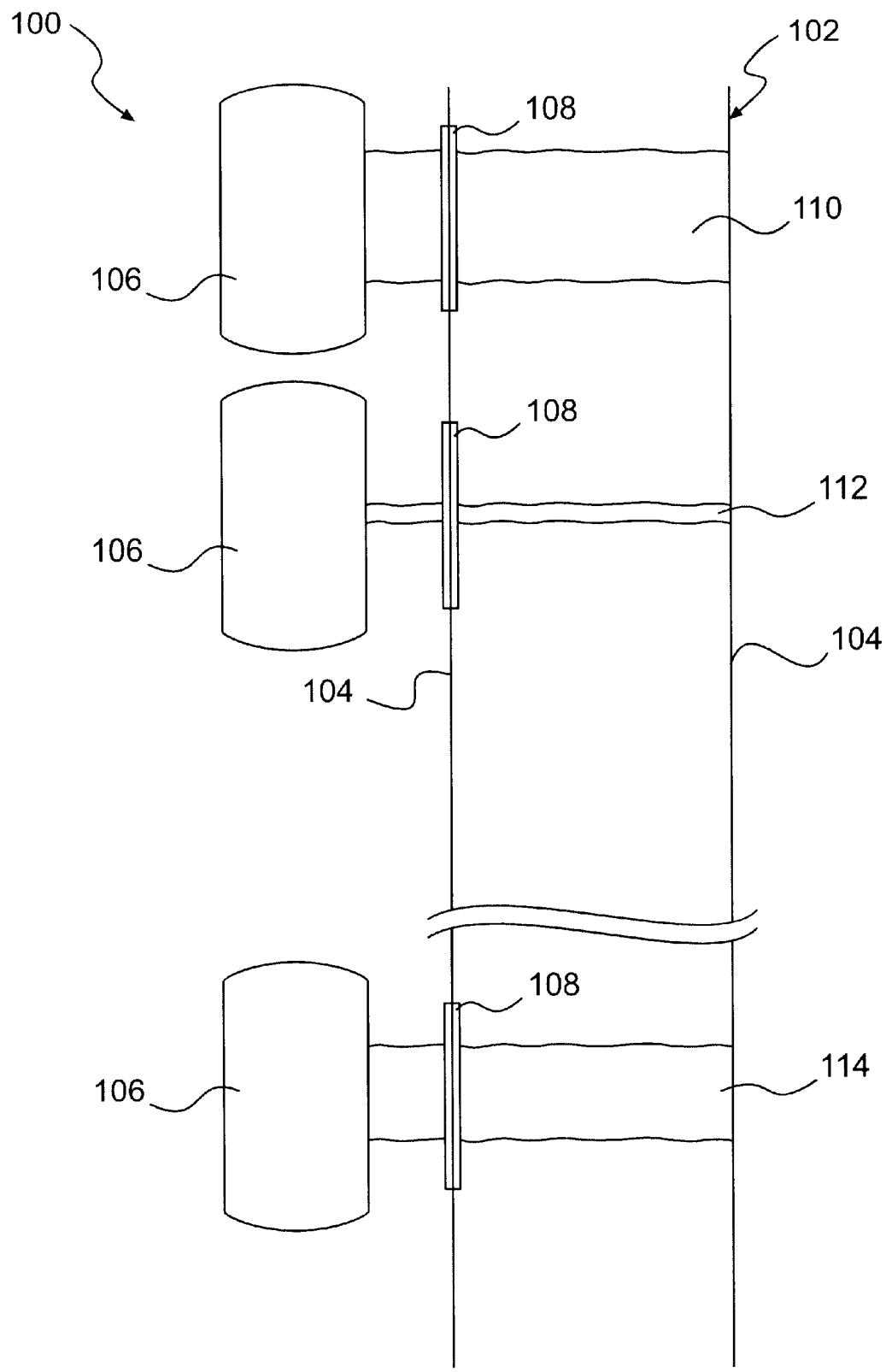
FIG. 8 is a diagram illustrating another embodiment of a reactor in accordance with the present invention.

Turning now to FIG. 8, another embodiment of the present invention is illustrated. The reactor 100 is similar to that shown in FIG. 7. The reactor 100 has a column 102 with side walls 104. A plurality of electromagnetic radiation generators 106 are positioned along the length of the column 102. For each generator 106, there is a window 108 that is transparent to electromagnetic radiation. Preferably each generator 106 delivers electromagnetic radiation through the window 108 to the column 102. Each generator provides constant radiation band to the column. The bands of radiation, represented by 110, 112, and 114, will cover a portion of the length of the column 102. The bands of radiation and the lengths of the column that are covered may vary. As the catalyst particles pass through the column, the particles pass through the band of radiation. In this way the particles are effectively pulsed. The time between bands allows the particles to cool before passing through a second band of radiation. This configuration allows for control of the catalyst temperature as the catalyst travels along the length of the reactor. Each generator 106 may deliver a deliver radiation having the same frequency as the other generators or the frequencies may be different. The generators should be spaced a distance apart along the length of the column to allow for catalyst regeneration. Further the size of the bands may vary from one generator to the other.

With reference to FIGS. 6–8, the column may take on a variety of shapes and configurations. The column may be cylindrical. The source of electromagnetic radiation may be from VHF, UHF, microwave, infrared or laser radiation. The windows must allow a portion of the radiation to enter the column. Preferably, the window is made of a ceramic material. The material used for the window depends on the source of electromagnetic radiation. These materials are well known to those skilled in the art. Preferably, the column is made of stainless steel.

Several pulses of electromagnetic radiation may be applied to the catalyst particles. Depending on how long the catalyst particles are in the reactor, several pulses of electromagnetic radiation may be applied. This effectively extends the active life of the catalyst in the reactor. Whereas previously, the catalysts was only active in the initially moments upon introduction to the reactor, electromagnetic pulses may be applied to maintain the activity of the catalyst in the reactor.

The present invention is able to maintain the activity of the catalyst particles in the reactor. Further the present invention is able to increase the mass-exchange through the catalysts particles and switch the catalytic activity on and off when necessary, and reduce the formation of coke on the catalyst. As a result, severe and expensive conditions for regeneration of the catalyst is not necessary.

Figure 9A:
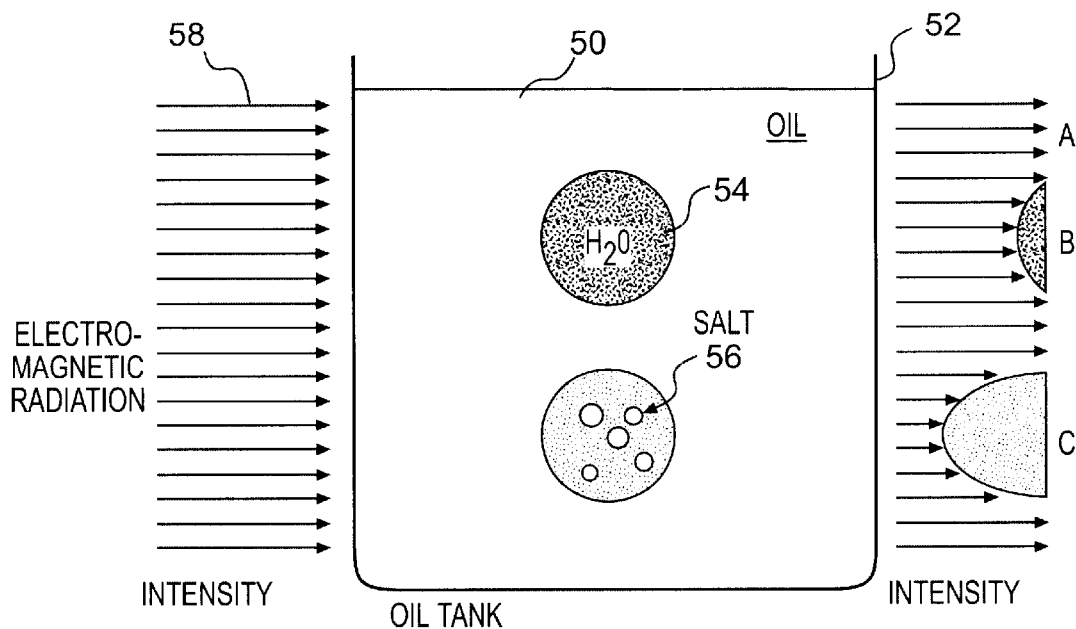
FIG. 9 is a diagram illustrating a model for the dewatering and desalination process.
Figure 9B:
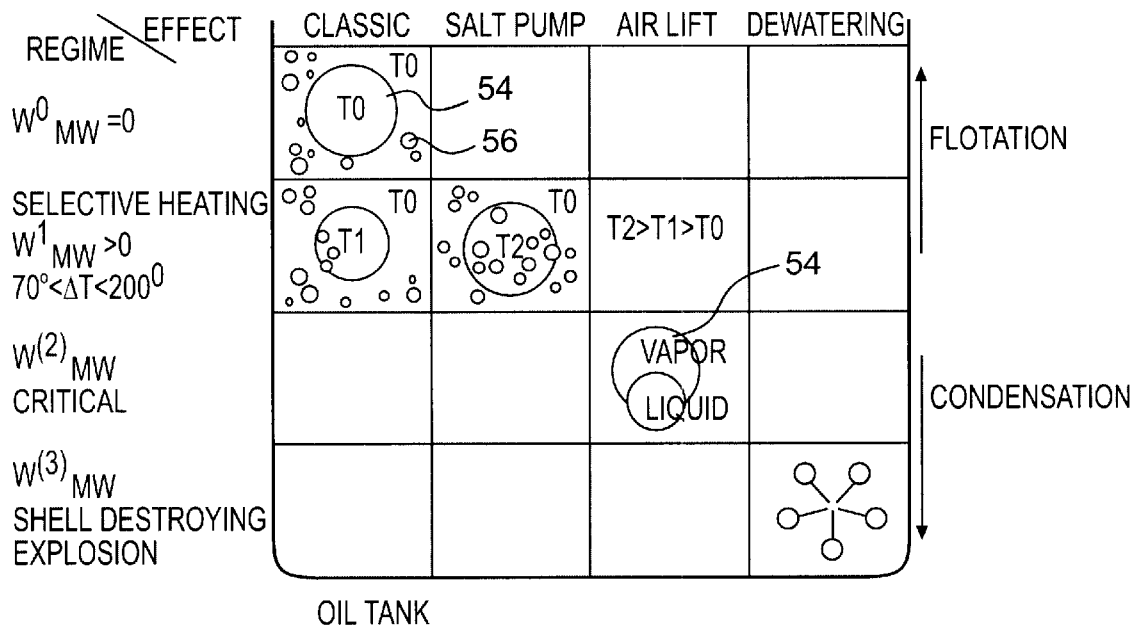
Figure 10:
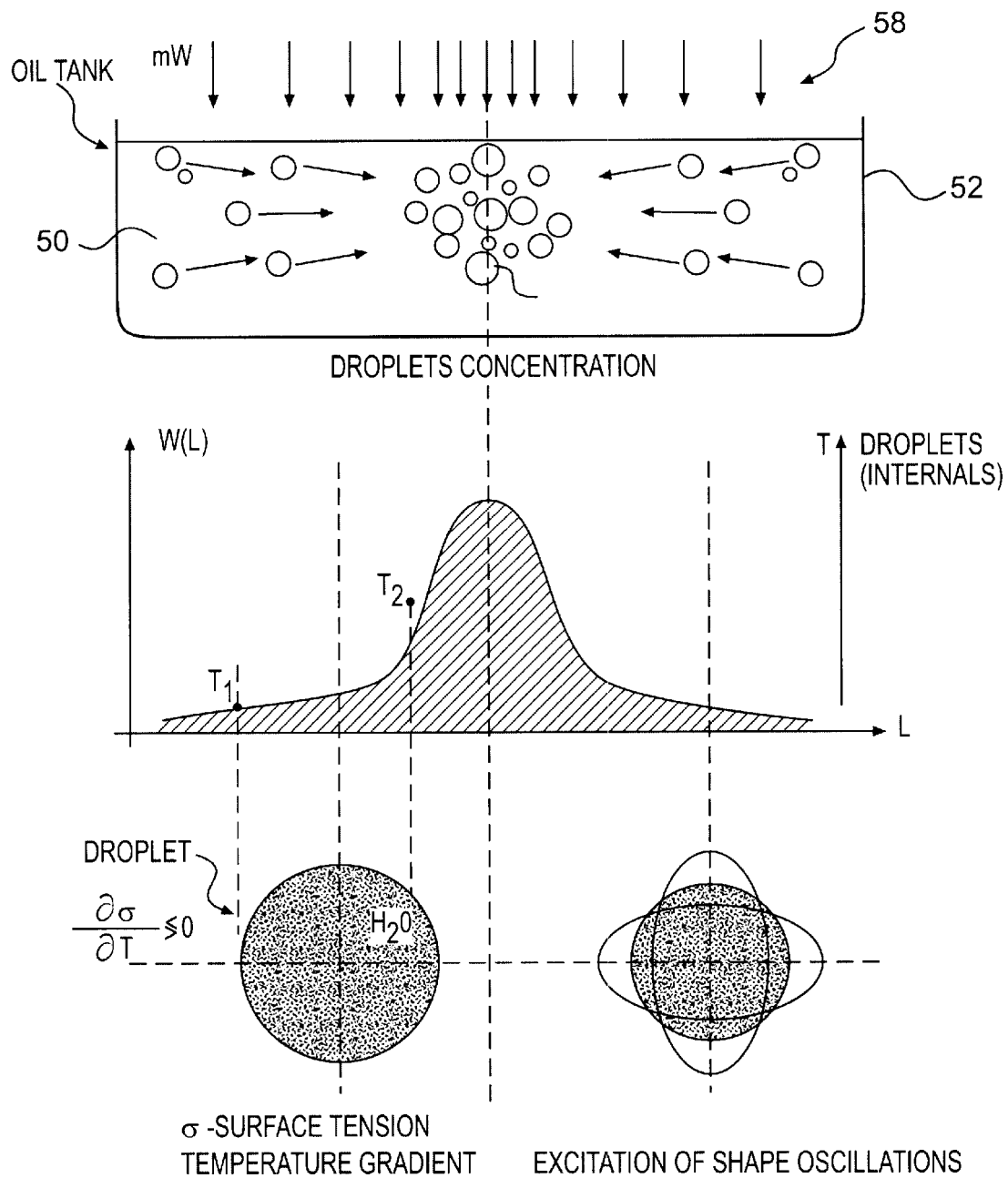
FIG. 10 is diagram illustrating a droplet concentration mechanism under non-homogeneous irradiation.

With reference now to FIGS. 9 and FIG. 10, the next aspects of the present invention directed to dewatering and desalination of an organic feed are illustrated. An additional problem with organic feed processing is the presence of water and salts in the feed. The principles of using an electromagnetic pulse to reduce coke formation on a catalyst particle may be applied to the dewatering and desalination of an organic feed.

The present invention applies a pulse of electromagnetic radiation to an organic feed to encourage water that is dispersed throughout the feed to form larger water droplets. Turning to FIG. 9(a) there is illustrated an organic feed 50 in a holding device 52. Water 54 and salt 56 are also contained in the organic feed. Electromagnetic radiation 58 is applied to the organic feed. Since water is not transparent to the pulse of electromagnetic radiation, the water will absorb the energy. As a result, the temperature of the water increases, increasing the mobility of the water in the oil allowing the water to form larger droplets of water. FIG. 10 illustrates the mechanism for concentrating water droplets by applying electromagnetic radiation 58 to the petroleum feed 50.

Often the organic feed will contain salts that must be removed from the feed. The salts are typically soluble in water. Typical salts include chlorides and sulfates such as calcium chloride, magnesium chloride, sodium chloride, ferric chloride and sodium sulfate. Concentrations ranges acceptable for pipelines range from about 0.1–2% for water and about 8–10 grains per barrel for salts.

The solubility of salts is directly related to temperature. As the temperature increases, the solubility of the salt will increase. FIG. 9(b), illustrates several possibilities with respect to water 54 and salt 56 contained in an organic feed 50. In the classical situation where no electromagnetic radiation is applied, water and salts are contained in the organic feed. As the electromagnetic radiation is applied to the feed, the water begins to heat and form droplets. The temperature of the water droplets increase and salt is drawn into the water droplets as represented in the classical column of FIG. 9(b). The water droplet with the salt now absorbs electromagnetic radiation more intensely resulting in growth and increase in temperature of the droplet allowing for more salt to become dissolved in the droplet as illustrated in the salt pump column of FIG. 9(b). In this way, salt is effectively pumped from the organic feed to the water droplets.

In one embodiment, a pulse of electromagnetic radiation may be applied to heat the water contained in the organic feed. The pulse of electromagnetic radiation may range from about 0.4 MHz to about 100 HHz . The duration of the pulse may vary depending on the organic feed and the frequency of the radiation. In one embodiment the duration of the pulse may range on the order of about $10^{-6}$ seconds to about $10^1$ seconds.

Removal of the water and salt may be accomplished by applying a second, vaporizing pulse. This second pulse is designed to selective vaporize a portion of the droplet without destroying the shell of the droplet as illustrated in the air lift column of FIG. 9(b). The second pulse is applied to form a liquid-vapor water complex. The complex will rise to the surface of the organic feed. The complex containing water and salt will rise to the surface where they may be removed by skimming the surface of the feed or by adding surfactants followed by skimming of the feed. Alternatively, the complex will contact other complexes and produce a larger water droplet. The larger droplet may grow large enough to fall to the bottom of the organic feed.

The second, vaporizing pulse must be sufficient to vaporize a portion of the droplet without destroying the shell of the droplet as illustrated at the bottom of the dewatering column of FIG. 9(b). The parameters of the second pulse may vary depending on the organic feed and the frequency of the radiation used. In a preferred embodiment, the radiation may range from about 0.4 MHz to about 100 HHz . The duration of the second pulse may vary depending on the organic feed, the frequency of the radiation for the first and second pulses, and the duration of the first pulse. In one embodiment the duration of the second pulse may range on the order of about $10^{-6}$ seconds to about $10^0$ seconds.

In another embodiment, the radiation may be sufficient to destroy the shell of the water droplets and vaporize water contained in the organic feed. This is illustrated in the dewatering column of FIG. 9(b).

Figure 11:
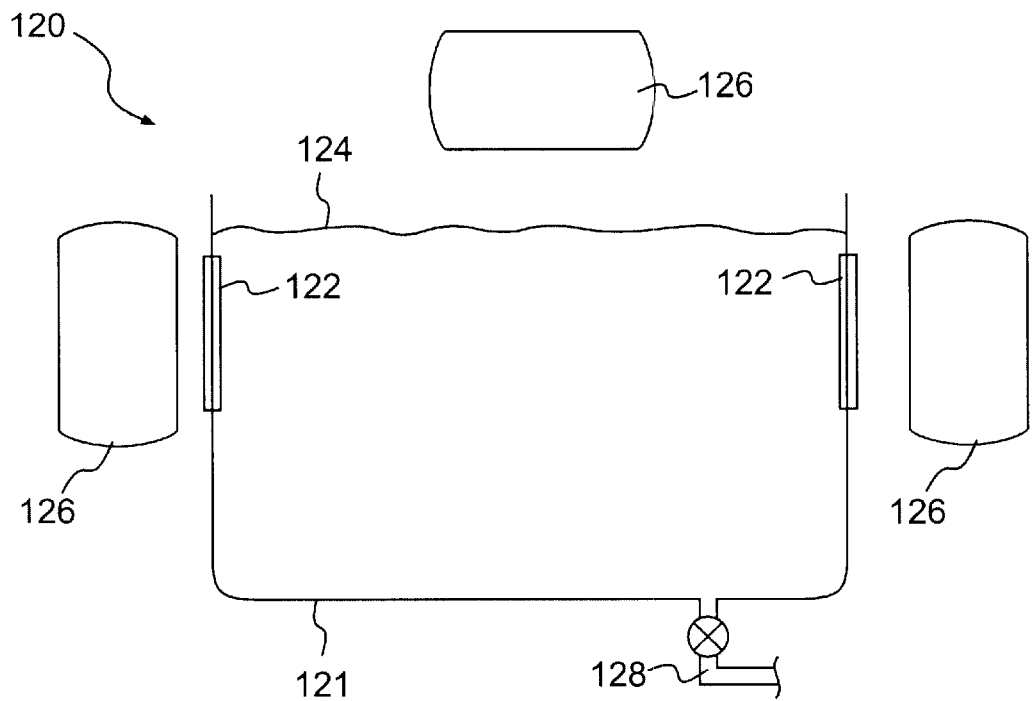
FIG. 11 is a diagram of a dewatering device in accordance with one embodiment of the present invention.
Figure 12:
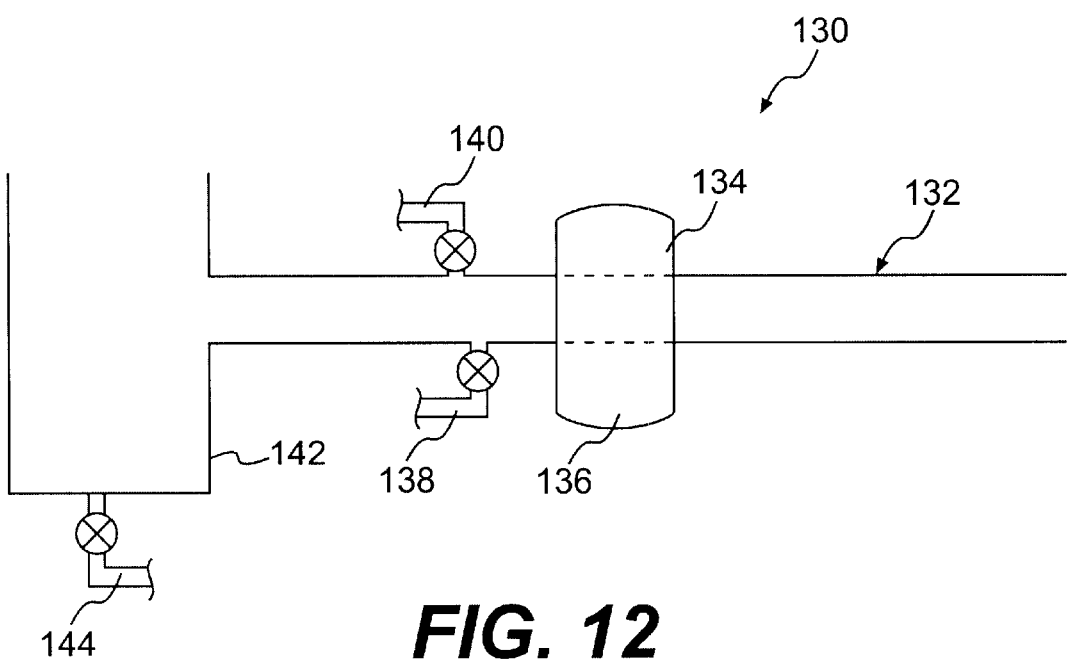
FIG. 12 is a diagram of a dewatering apparatus in accordance with one embodiment of the present invention.

With reference now to FIG. 11 there is shown one embodiment of a dewatering device 120 in accordance with the present invention. The device 120 has a container 121 suitable for holding an organic feed. The container may include, but not limited to, a barrel, an oil tank, plastic holding container or any suitable container for holding an organic feed. The container 121 either has a window 122 that is transparent to the electromagnetic radiation or an opening 124, such that at least a portion of the organic feed is exposed to the electromagnetic radiation. One or more electromagnetic generators 126 are placed about the container 121 and positioned such that the electromagnetic radiation passes either through the window 122 or the opening 124. A drain 128 may be located near the bottom of the container 121 for draining condensed water. ease replace the paragraph beginning on page 47, line 19 with the following:

With reference now to FIG. 12, there is illustrated dewatering apparatus 130 in accordance with one embodiment of the present invention. The apparatus 130 has a pipe 132 for transporting an organic feed. A window 134 is located on a portion of the pipe 132. An electromagnetic generator 136 is position such that electromagnetic radiation passes through the window 134 into the pipe 132, thus exposing at least a portion of the organic feed to the radiation. The pipe 132 may contain a drain 138 after the generator 136 for draining condensed water from the organic feed. Further the pipe 132 may contain a vent 140 after the generator 136 for venting water that has been vaporized. Still further, holding device 142 may be placed after the generator for collecting the organic feed. The holding device 142 may have a holding device drain 144 near the bottom of the holding device for draining condensed water.

With reference to FIGS. 11 and 12, the source of electromagnetic radiation may be from VHF, UHF, microwave, infrared or laser radiation. The windows must allow a portion of the radiation to enter the column. Preferably, the window is made of a ceramic material. The material used for the window depends on the source of electromagnetic radiation. These materials are well known to those skilled in the art.

It will be readily understood by those persons skilled in the art that the present invention is susceptible to broad utility and application. Many embodiments and adaptations of the present invention other than those herein described, as well as many variations, modifications and equivalent arrangement, will be apparent from or reasonably suggested by the present invention and the foregoing description without departing from the substance or scope of the present invention.

Accordingly, while the present invention has been described in detail in relation to its preferred embodiment, it is to be understood that this disclosure is only illustrative and exemplary of the present invention and is made merely for purposes of providing a full and enabling disclosure of the invention. The foregoing disclosure is not intended to be construed to limit the present invention or otherwise exclude any other embodiments, adaptations, variations, modifications or equivalent arrangements, the present invention being limited only by the claims and the equivalents thereof.

What is claimed is:

1. A method for processing an organic feed comprising the steps of:
   exposing the organic feed to a catalyst; and
   applying more than one pulse of electromagnetic radiation to at least a portion of said catalyst wherein each pulse of electromagnetic radiation is sufficient to raise a temperature of the catalyst above a temperature of the organic feed and a time between each pulse is sufficient to allow the catalyst to cool to a temperature of at least about the temperature of the organic feed.

2. The method of claim 1 wherein said pulses are applied while the catalyst is in contact with the organic feed.

3. The method of claim 1 wherein said applying step includes pulsing said organic feed at least two different frequencies.

4. The method of claim 1 wherein a time between pulses is different.

5. The method of claim 1 wherein the electromagnetic radiation has a frequency of at least about 1 MHz.

6. The method of claim 5 wherein the electromagnetic radiation is selected from the group consisting of VHF, UHF, microwave, infrared, and laser radiation.

7. The method of claim 1 wherein the electromagnetic radiation has a frequency ranging from about 1 MHz to about 100 HHz.

8. The method of claim 1 wherein at least a pulse of said more than one pulse of electromagnetic radiation has a duration ranging on the order of about $10^{-6}$ to about $10^{0}$ seconds and the time between pulses ranges on the order of about $10^{-6}$ to about $10^{2}$ seconds.

9. The method of claim 1 wherein the steps of exposing the organic feed to the catalyst and applying more than one pulse to at least a portion of the catalyst are effective for processing at least a portion of the organic feed.

10. The method of claim 9 wherein processing is selected from the group consisting of simple cracking, hydrocracking, hydrogenation, hydroisomerization, hydrodesulfurization, and reforming.

11. The method of claim 1 wherein the steps of exposing the organic feed to the catalyst and applying more than one pulse to at least a portion of the catalyst are effective for reducing the formation of coke on the catalyst.

12. The method of claim 1 wherein each pulse in said applying step is sufficient to regenerate the activity of the catalyst.

13. The method of claim 1 wherein the organic feed is selected from the group consisting of hydrocarbon liquids, hydrocarbon vapor, petroleum feed, liquified coal, dispersed coal, oil, crude oil, fractions of oil, naptha, gasoline, jet fuel, and combinations thereof.

* * * * *

UNITED STATES PATENT AND TRADEMARK OFFICE
CERTIFICATE OF CORRECTION

PATENT NO. : 6,451,174 B1  Page 1 of 1
APPLICATION NO. : 09/709307
DATED : September 17, 2002
INVENTOR(S) : Serik M. Burkitbaev It is certified that error appears in the above-identified patent and that said Letters Patent is hereby corrected as shown below:

All occurences of "HHz" should read --THz--. Applicant believes the following to be a complete list of all such occurences:
Col. 1, line 62
Col. 2, lines 34 and 62
Col. 3, lines 22, 39, and 60
Col. 4, lines 10 and 26
Col. 20, line 57
Col. 22, line 42
Col. 25, lines 15 and 39
Claim 7, line 3

Signed and Sealed this

Fifth Day of January, 2010

David J. Kappos
*Director of the United States Patent and Trademark Office*

UNITED STATES PATENT AND TRADEMARK OFFICE
CERTIFICATE OF CORRECTION

PATENT NO.        : 6,451,174 B1                                          Page 1 of 1
APPLICATION NO.   : 09/709307
DATED             : September 17, 2002
INVENTOR(S)       : Serik M. Burkitbaev It is certified that error appears in the above-identified patent and that said Letters Patent is hereby corrected as shown below:

All occurrences of "HHz" should read --THz--. Applicant believes the following to be a complete list of all such occurrences:
Col. 1, line 62
Col. 2, lines 34 and 62
Col. 3, lines 22, 39, and 60
Col. 4, lines 10 and 26
Col. 20, line 57
Col. 22, line 42
Col. 25, lines 15 and 39
Col. 26, Claim 7, line 67

This certificate supersedes the Certificate of Correction issued January 5, 2010.

Signed and Sealed this

Ninth Day of February, 2010

David J. Kappos
*Director of the United States Patent and Trademark Office*